United States Patent
Tanaka et al.

(10) Patent No.: US 8,320,740 B2
(45) Date of Patent: Nov. 27, 2012

(54) INFORMATION PROCESSING APPARATUS AND METHOD, PROGRAM, AND RECORD MEDIUM

(75) Inventors: Hisao Tanaka, Tokyo (JP); Masaki Hirose, Tokyo (JP); Takayoshi Kawamura, Kanagawa (JP); Hiroshi Saitou, Osaka (JP); Yoshiho Gotoh, Osaka (JP); Tatsushi Bannai, Osaka (JP)

(73) Assignees: Sony Corporation, Tokyo (JP); Matsushita Electric Industrial Co., Ltd., Osaka (JP)

( * ) Notice: Subject to any disclaimer, the term of this patent is extended or adjusted under 35 U.S.C. 154(b) by 937 days.

(21) Appl. No.: 10/560,152

(22) PCT Filed: Jun. 10, 2004

(86) PCT No.: PCT/JP2004/008502
§ 371 (c)(1),
(2), (4) Date: Mar. 27, 2007

(87) PCT Pub. No.: WO2005/002222
PCT Pub. Date: Jan. 6, 2005

(65) Prior Publication Data
US 2007/0274165 A1    Nov. 29, 2007

(30) Foreign Application Priority Data
Jun. 11, 2003   (JP) .................................. 2003-165835

(51) Int. Cl.
*H04N 9/80* (2006.01)
(52) U.S. Cl. .................................................... 386/248
(58) Field of Classification Search ................ 386/1, 46, 386/77, 83, 95, 124–126, 248, 262, 323, 386/343, 344
See application file for complete search history.

(56) References Cited

U.S. PATENT DOCUMENTS 6,532,334 B1 * 3/2003 Kikuchi et al. ................ 386/68
7,099,239 B2 * 8/2006 Ogikubo .................... 369/30.23

FOREIGN PATENT DOCUMENTS

| JP | 11-213522 | 8/1999 |
| JP | 2000-57751 | 2/2000 |
| JP | 2002-112201 | 4/2002 |
| JP | 2003-77222 | 3/2003 |
| JP | 2003-77257 | 3/2003 |
| JP | 2003-151245 | 5/2003 |
| JP | 2004-206784 | 7/2004 |

OTHER PUBLICATIONS

Trick Play Schemes for Advanced Television Recording on Digital VCR by Hou-Chun and Huesh-Ming Hang (IEEE Transactions on Consumer Electronics, vol. 41, No. 4, Nov. 1995).*

* cited by examiner

*Primary Examiner* — Tat Chio
(74) *Attorney, Agent, or Firm* — Frommer Lawrence & Haug LLP; William S. Frommer; Ellen Marcie Emas

(57) ABSTRACT

To improve the convenience of a record medium and allow a reproduction process to be more easily performed than before. When a reproduction process 123 that reproduces material data recorded on a disc 32 is executed, a disc information file management section 63 references a reproduction history of a disc information file held in a disc information file hold section 52 and starts reproducing material data from a position according to the reproduction history. When the reproduction process is completed, the disc information file management section 63 updates the reproduction history of the disc information file held in the disc information file hold section 52. A disc information file record control section 82 records the updated disc information file on the disc 32.

4 Claims, 34 Drawing Sheets

*Fig. 7*

```
1  <?xml version="1.0" encoding="UTF-8"?>
2  <indexFile xmlns="urn:schemas-professionalDisc:index"
3    indexId="0123456789ABCDEF0123456789ABCDEF">
4    <clipTable path="/PROAV/CLPR/"/>
5    <!-- Normal Clip -->
6    <clip id="C0001" umid="0D1213000000000010444444484EEEEE00E0188E130B"
7      file="C0001C01.SMI" fps="59.94i" dur="12001" ch="4" aspectRatio="4:3">
8      <video umid="0D1213000000000010444444484EEEEE00E0188E130B"
9        file="C0001V01.MXF" type="DV25_411" header="65536"/>
10     <audio umid="0D1213000000000010444444484EEEEE00E0188E130B"
11       file="C0001A01.MXF" type="LPCM16" header="65536" trackDst="CH1"/>
12     <audio umid="0D1213000000000010444444484EEEEE00E0188E130B"
13       file="C0001A02.MXF" type="LPCM16" header="65536" trackDst="CH2"/>
14     <audio umid="0D1213000000000010444444484EEEEE00E0188E130B"
15       file="C0001A03.MXF" type="LPCM16" header="65536" trackDst="CH3"/>
16     <audio umid="0D1213000000000010444444484EEEEE00E0188E130B"
17       file="C0001A04.MXF" type="LPCM16" header="65536" trackDst="CH4"/>
18     <subStream umid="0D1213000000000010444444484EEEEE00E0188E130B"
19       file="C0001S01.MXF" type="PD-SubStream" header="65536"/>
20     <meta file="C0001M01.XML" type="PD-Meta"/>
21     <meta file="C0001M02.TXT" type="key:0123456789ABCDEF"/>
22     <rtmeta file="C0001R01.BIM" type="std2k" header="65536"/>
23   </clip>
24   <!-- Partial Deleted Clip -->
25   <clip id="C0002" umid="0D1213000000000010444444484EEEEE00E0188E130B"
26     file="C0002C01.SMI" fps="59.94i" dur="4000" ch="4" aspectRatio="4:3">
27     <video umid="0D1213000000000010444444484EEEEE00E0188E130B"
28       file="C0002V01.MXF" type="IMX50" header="80000"/>
29     <audio umid="0D1213000000000010444444484EEEEE00E0188E130B"
```

Fig. 8

```
1      file="C0002A01.MXF" type="LPCM16" header="100000" trackDst="CH1"/>
2    <audio umid="0D121300000000000000000010444444484EEEEE00E0188E130B"
3      file="C0002A02.MXF" type="LPCM16" header="100000" trackDst="CH2"/>
4    <audio umid="0D121300000000000000000010444444484EEEEE00E0188E130B"
5      file="C0002A03.MXF" type="LPCM16" header="100000" trackDst="CH3"/>
6    <audio umid="0D121300000000000000000010444444484EEEEE00E0188E130B"
7      file="C0002A04.MXF" type="LPCM16" header="100000" trackDst="CH4"/>
8    <subStream umid="0D121300000000000000000010444444484EEEEE00E0188E130B"
9      file="C0002S01.MXF" type="PD-SubStream" header="90000"
10       clipBegin="8"/>
11   <meta file="C0002M01.XML" type="PD-Meta"/>
12   <rtmeta file="C0002R01.BIM" type="std2k" header="70000"/>
13 </clip>
14 <!-- Refered Clip -->
15 <clip id="C0003" umid="0D121300000000000000000010444444484EEEEE00E0188E130B"
16     file="C0003C01.SMI" fps="59.94i" dur="100000" ch="4" aspectRatio="4:3"
17     referer="E0001 E0002 E0003">
18   <video umid="0D121300000000000000000010444444484EEEEE00E0188E130B"
19     file="C0003V01.MXF" type="IMX50" header="65536"/>
20   <audio umid="0D121300000000000000000010444444484EEEEE00E0188E130B"
21     file="C0003A01.MXF" type="LPCM16" header="65536" trackDst="CH1"/>
22   <audio umid="0D121300000000000000000010444444484EEEEE00E0188E130B"
23     file="C0003A02.MXF" type="LPCM16" header="65536" trackDst="CH2"/>
24   <audio umid="0D121300000000000000000010444444484EEEEE00E0188E130B"
25     file="C0003A03.MXF" type="LPCM16" header="65536" trackDst="CH3"/>
26   <audio umid="0D121300000000000000000010444444484EEEEE00E0188E130B"
27     file="C0003A04.MXF" type="LPCM16" header="65536" trackDst="CH4"/>
28   <subStream umid="0D121300000000000000000010444444484EEEEE00E0188E130B"
29     file="C0003S01.MXF" type="PD-SubStream" header="65536"/>
```

Fig. 9

```
1   <meta file="C0003M01.XML" type="PD-Meta"/>
2   <rtmeta file="C0003R01.BIM" type="std2k" header="65536"/>
3   </clip>
4   <!-- Long GOP -->
5   <clip id="C0004" umid="0D1213000000000000001044444484EEEE00E0188E130B"
6       file="C0004C01.SMI" fps="59.94i" dur="12001" ch="4" aspectRatio="16:9"
7       referer="E0004">
8       <video umid="0D1213000000000000001044444484EEEE00E0188E130B"
9           file="C0004V01.MXF" type="MPEG2HD25_1440_MP@HL" header="65536"/>
10      <audio umid="0D1213000000000000001044444484EEEE00E0188E130B"
11          file="C0004A01.MXF" type="LPCM16" header="65536" trackDst="CH1"/>
12      <audio umid="0D1213000000000000001044444484EEEE00E0188E130B"
13          file="C0004A02.MXF" type="LPCM16" header="65536" trackDst="CH2"/>
14      <audio umid="0D1213000000000000001044444484EEEE00E0188E130B"
15          file="C0004A03.MXF" type="LPCM16" header="65536" trackDst="CH3"/>
16      <audio umid="0D1213000000000000001044444484EEEE00E0188E130B"
17          file="C0004A04.MXF" type="LPCM16" header="65536" trackDst="CH4"/>
18      <subStream umid="0D1213000000000000001044444484EEEE00E0188E130B"
19          file="C0004S01.MXF" type="PD-SubStream" header="65536"/>
20      <meta file="C0004M01.XML" type="PD-Meta"/>
21      <meta file="C0004I01.XML" type="PD-PP"/>
22      <rtmeta file="C0004R01.BIM" type="std2k" header="65536"/>
23  </clip>
24  </clipTable>
25  <editlistTable path="/PROAV/EDTR/"/>
26  <editlist id="E0001" umid="0D1213000000000000001044444484EEEE00E0188E130B"
27      file="E0001E01.SMI" dur="500" fps="59.94i" ch="4" aspectRatio="4:3">
28      <meta file="E0001M01.XML" type="PD-Meta"/>
```

*Fig. 10*

```
1  </editlist>
2  <editlist id="E0002" umid="0D1213000000000000010444444484EEEE00E0188E130B"
3      file="E0002E01.SMI" dur="500" fps="59.94i" ch="4" aspectRatio="4:3">
4      <meta file="E0002M01.XML" type="PD-Meta"/>
5  </editlist>
6  <editlist id="E0003" umid="0D1213000000000000010444444484EEEE00E0188E130B"
7      file="E0003E01.SMI" dur="500" fps="59.94i" ch="4" aspectRatio="4:3">
8      <meta file="E0003M01.XML" type="PD-Meta"/>
9  </editlist>
10 <editlist id="E0004" umid="0D1213000000000000010444444484EEEE00E0188E130B"
11     file="E0003E01.SMI" dur="500" fps="59.94i" ch="4" aspectRatio="16:9">
12     <meta file="E0003M01.XML" type="PD-Meta"/>
13     <meta file="E0003I01.XML" type="PD-PP"/>
14 </editlist>
15     </editlistTable>
16 </indexFile>
```

*Fig. 11*

```
1  <?xml version="1.0" encoding="UTF-8"?>
2  <discinfo xmlns="urn:schemas-professionalDisc:discinfo">
3      <history>
4          <clip id="C0003" ftc="smpte-30-drop=00:30:12:23" />
5          <editlist id="E0001" ftc="smpte-30-drop=00:00:00:15" />
6          <tape id="C0003" ftc="smpte-30-drop=00:02:23:12" />
7          <editlist id="E0004" ftc="smpte-30-drop=00:00:10:02" />
8          <clip id="C0002" ftc="smpte-30-drop=00:01:02:03" />
9          <clip id="C0004" ftc="smpte-30-drop=00:05:43:21" />
10     </history>
11 </discinfo>
```

Fig. 17

```
1  <?xml version="1.0" encoding="UTF-8"?>
2  <smil xmlns="urn:schemas-professionalDisc:edl:clipInfo">
3    <head>
4      <metadata type="Meta">
5        <!-- nonrealtime meta -->
6        <NRMeta xmlns="urn:schemas:proDisc:nrt">
7          <ref src="C0001M01.XML"/>
8        </NRMeta>
9      </metadata>
10   </head>
11   <body>
12     <par>
13       <switch>
14         <!-- main stream -->
15         <par systemComponent="IMX50">
16           <video
17  src="urn:smpte:umid:060A2B34010105010100121300000001234567890ABCDEF"
18  type="IMX50"/>
19           <audio
20  src="urn:smpte:umid:060A2B34010105010100121300000001234567890ABCDEF0"
21  type="LPCM16" trackDst="CH1"/>
22           <audio
23  src="urn:smpte:umid:060A2B34010105010100121300000002234567890ABCDEF01"
24  type="LPCM16" trackDst="CH2"/>
25           <audio
26  src="urn:smpte:umid:060A2B34010105010100121300000003234567890ABCDEF012"
27  type="LPCM16" trackDst="CH3"/>
28           <audio
29  src="urn:smpte:umid:060A2B34010105010100121300000004234567890ABCDEF0123"
```

Fig. 18

```
1  type="LPCM16" trackDst="CH4"/>
2     <audio
3       src="urn:smpte:umid:060A2B3401010105010l0D121300000056789ABCDEF01234"
4       type="LPCM16" trackDst="CH5"/>
5     <audio
6       src="urn:smpte:umid:060A2B3401010105010l0D121300000006789ABCDEF012345"
7       type="LPCM16" trackDst="CH6"/>
8     <audio
9       src="urn:smpte:umid:060A2B3401010105010l0D121300000000789ABCDEF0123456"
10      type="LPCM16" trackDst="CH7"/>
11    <audio
12      src="urn:smpte:umid:060A2B3401010105010l0D121300000000089ABCDEF01234567"
13      type="LPCM16" trackDst="CH8"/>
14    </par>
15    <!-- sub stream -->
16    <ref
17      src="urn:smpte:umid:060A2B3401010105010l0D121300000000009ABCDEF012345678"
18      type="SubStream" systemComponent="SubStream"/>
19    </switch>
20    <!-- realtime meta -->
21    <metastream src="C0001R01.BIM" type="required2k"/>
22  </par>
23  </body>
24 </smil>
```

*Fig. 22*

```
1  <?xml version="1.0" encoding="UTF-8"?>
2  <smil xmlns="urn:schemas-professionalDisc:edl:editList">
3    <head>
4      <metadata type="Meta">
5        <!-- nonrealtime meta -->
6        <NRMeta xmlns="urn:schemas:professionalDisc:nrt">
7          <ref src="E0002M01.XML"/>
8        </NRMeta>
9      </metadata>
10   </head>
11   <body>
12     <par>
13       <!-- Clip1 -->
14       <ref
15  src="urn:smpte:umid:060A2B3401010105010100D1213000000FEDCBA9876543210"
16  type="edlDoc" begin="smpte-30=00:00:00:00" clipBegin="smpte-30=00:00:00:00" clipEnd="smpte-
17  30=00:10:00:00"/>
18       <!-- Clip2 -->
19       <ref
20  src="urn:smpte:umid:060A2B3401010105010100D1213000000EDCBA9876543210F"
21  type="edlDoc" begin="smpte-30=00:10:00:00" clipBegin="smpte-30=00:02:00:00" clipEnd="smpte-
22  30=00:03:30:00"/>
23     </par>
24   </body>
25  </smil>
```

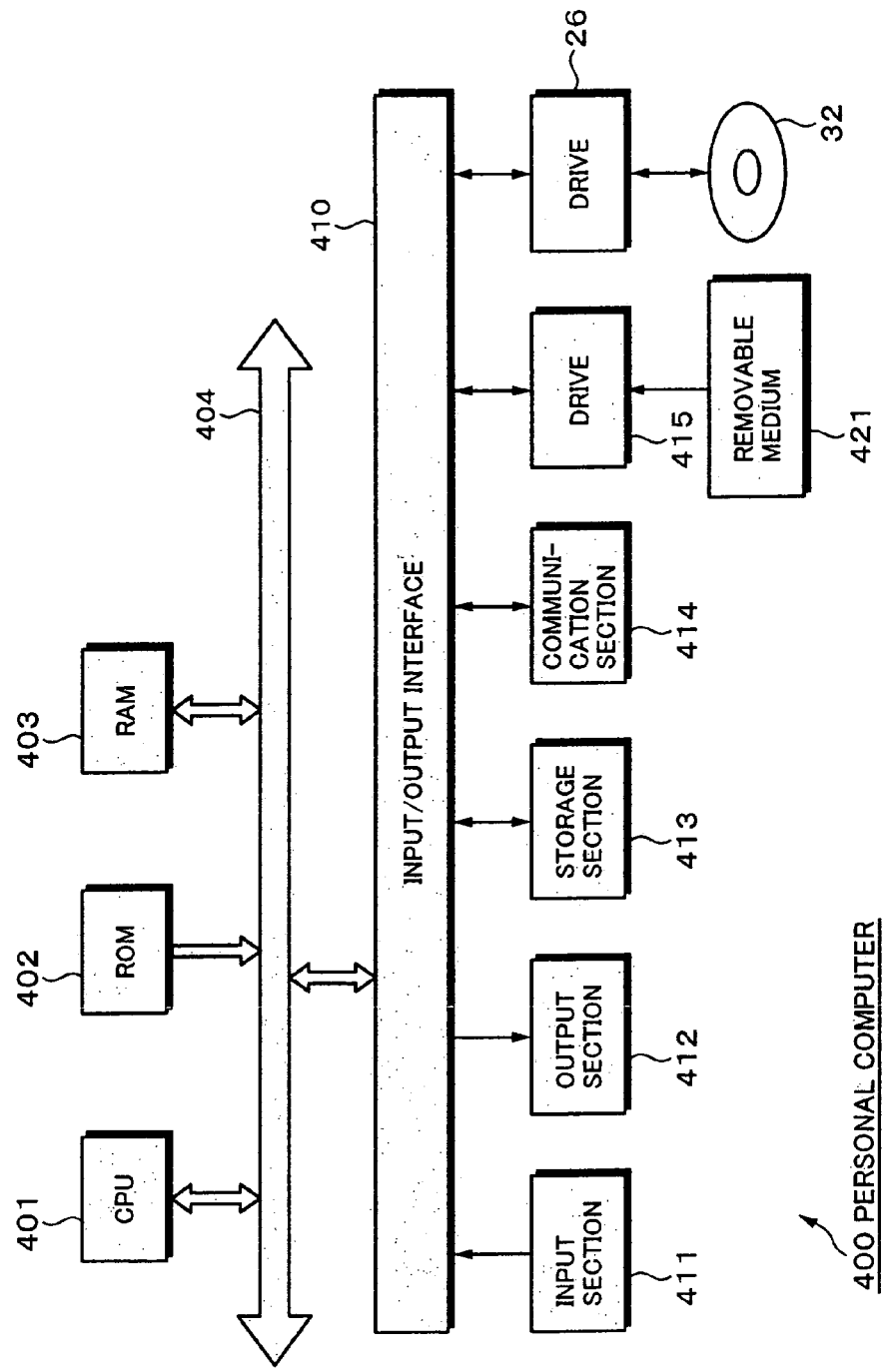

INFORMATION PROCESSING APPARATUS AND METHOD, PROGRAM, AND RECORD MEDIUM

TECHNICAL FIELD

The present invention relates to an information process apparatus and method, a program, and a record medium, in particular, to those that allow a reproduction process and so forth to be more easily performed than before.

BACKGROUND ART

Conventionally, material data such as video data and audio data that are photographed and sound-recorded are recorded on a tape device such as a video tape that is a record medium. In other words, when the user moves material data from a first device to a second device, the material data is moved through a tape device.

In the tape device, material data are recorded along the time axis that is the longitudinal direction of the tape. Thus, when the first device stops the reproduction for material data (in the middle thereof) and the second device resumes the reproduction from the stop position of the material data, the tape device physically records the reproduction stop position (as position information). In other words, when the first device stops the reproduction, the device stops the tape feed of the tape device and holds. the position (as the reproduction stop position) on the tape. Thus, when such a tape device is loaded into the drive of the second device, the second device can resume the reproduction from the position of the tape device (namely, the reproduction stop position of the first device).

Normally, since an edit operation is performed while reproduced material data is being referenced, the foregoing process is performed when material data are edited. When the first device stops an edit process and the second device resumes the edit operation, as described above, since the reproduction stop position is held, the user can resume the edit operation from the position at which the first device stopped the edit process.

However, as the information process technologies have been improved in recent years, information has been digitized and discs such as DVD (Digital Versatile Disc) have been used as record mediums. Although the position of a magnetic head of an information read device of the tape device is fixed, the position of a pickup of a device that reads information from a disc is moved.

Thus, as described above, when the reproduction for material data is stopped and the material data are moved to another device through a disc, the disc on which the material data are recorded does not hold the last reproduction stop position. Thus, the material data need to be reproduced from the beginning. Likewise, when the edit operation is stopped, the last edit stop position becomes uncertain.

DISCLOSURE OF THE INVENTION

The present invention is made from the foregoing point of view and an object of the present invention is to improve convenience of a record medium so that for example a reproduction process can be more easily performed than before.

The present invention is an information process apparatus, comprising reproduction means for performing a reproduction process that reads and reproduces desired material data from a record medium according to the management information file, the material data containing pictures and sound and the management information file managing a file of the material data being recorded on the record medium that is attachable and detachable to and from the information process apparatus; generation means for generating reproduction history information about the reproduction process of the reproduction means, the reproduction history information composed of identification information of reproduced material data, information about a reproduction end position, and information about a reproduction method; record means for recording a list of the reproduction history information generated by the generation means as one file different from the management information file on the record medium; read means for reading the list of the reproduction history information recorded on the record medium by the record means; reproduction command accepting means for accepting a reproduction command for the material data; and reproduction control means for referencing the list of the reproduction history information read by the read means, specifying material data to be reproduced and a reproduction start postion according to reproduction history information according to a reproduction method designated by the reproduction command accepted by the reproduction command accepting means, controlling the reproduction means, and starting the reproduction process from the reproduction start position of the specified material data.

The present invention is an information process method, comprising the steps causing a reproduction section to execute a reproduction process that reads and reproduces desired material data from a record medium according to the management information file, the material data containing pictures and sound and the management information file managing a file of the material data being recorded on the record medium that is attachable and detachable to and from an information process apparatus; generating reproduction history information about the reproduction process executed by a process of the reproduction step, the reproduction history information composed of identification information of reproduced material data, information about a reproduction end postion, and information about a reproduction method; recording a list of the reproduction history information generated by a process of the generation step as one file different from the management information file on the record medium; causing a read section to read the list of the reproduction history information recorded on the record medium by a process of the record step; causing an accepting section to accept a reproduction command for the material data; and referencing the list of the reproduction history information read by a process of the read step, specifying material data to be reproduced and a reproduction start position according to reproduction history information according to a reproduction method designated by the reproduction command accepted by a process of the reproduction command accepting step, controlling an execution of a process of the reproduction step, and starting the reproduction process from the reproduction start position of the specified material data.

The present invention is a program, comprising the steps of causing a reproduction section to execute a reproduction process that reads and reproduces desired material data from a record medium according to a management information file, the material data containing pictures and sound and the management information file managing a file of the material data being recorded on the record medium that is attachable and detachable to and from an information process apparatus; generating reproduction history information about the reproduction process executed by a process of the reproduction step, the reproduction history information composed of identification information of reproduced material data, information about a reproduction end position, and information about a reproduction method; recording a list of the reproduction history information generated by a process of the generation step as one file different from the management information file on the record medium; causing a read section to read the list of the reproduction history information recorded on the record medium by a process of the record step; causing an accepting section to accept a reproduction command for the material data; and referencing the list of the reproduction history information read by a process of the read step, specifying material data to be reproduced and a reproduction start position according to reproduction history information according to a reproduction method designated by the reproduction command accepted by a process of the reproduction command accepting step, controlling an execution of a process of the reproduction step, and starting the reproduction process from the reproduction start position of the specified material data.

The present invention is a record medium, material data and a management information file being reproduced by an information process apparatus, reproduction history information about a reproduction process of the material data by an information process apparatus being recoded as one file that is different from the management information file, the reproduction history information composed of identification information of reproduced material data, information about a reproduction end position, and information about a reproduction method.

According to the information process apparatus and method, the program, and the record medium of the present invention, a reproduction process that reads and reproduces desired material data from a record medium according to the management information file is performed. The material data contains pictures and sound and the management information file that manages a file of the material data are recorded on the record medium that is attachable and detachable to and from an information process apparatus. Reproduction history information about the reproduction process, the reproduction history information composed of identification information of reproduced material data, information about a reproduction end position, and information about a reproduction method are generated. A list of the generated reproduction history information is recorded as one file different from the management information file on the record medium. The list of the reproduction history information recorded on the record medium is read. A reproduction command for the material data is accepted. The list of the reproduction history information is referenced. Material data to be reproduced and a reproduction start position are specified according to reproduction history information according to a reproduction method designated by the reproduction command. The reproduction process is started from the reproduction start position of the specified material data.

FIG. 7 is a schematic diagram showing an example of an XML description of an index file;

FIG. 8 is a schematic diagram showing an example of an XML description of the index file as a part preceded by FIG. 7;

FIG. 9 is a schematic diagram showing an example of an XML description of the index file as a part preceded by FIG. 8;

FIG. 10 is a schematic diagram showing an example of an XML description of the index file as a part preceded by FIG. 9;

FIG. 11 is a schematic diagram showing an example of an XML description of a disc information file;

FIG. 17 is a schematic diagram showing an example of an XML description of a clip information file;

FIG. 18 is a schematic diagram showing an example of an XML description of the clip information file as a part preceded by FIG. 17;

FIG. 22 is a schematic diagram showing an example of an XML description of an edit list file;

FIG. 34 is a block diagram showing an example of the structure of a computer according to an embodiment of the present invention.

BEST MODES FOR CARRYING OUT THE INVENTION

Next, embodiments of the present invention will be described. The relationship between the structural elements described in the claims and the embodiments of the present patent application is as follows. This relationship represents that examples that support the claims of the present patent application are described in the embodiments of the present patent application. Thus, even if examples corresponding to the embodiments are not described in this section, the examples should not be construed as those that do not correspond to the structural elements of the claims of the present patent application. In contrast, even if examples are described in this section as those that correspond to the structural elements of the claims, the examples should not be construed as those that do not correspond to other than the structural elements of the claims of the present patent application.

In addition, the description of this section does not mean that all aspects of the present invention that correspond to the examples described in the embodiments of the present patent application are not described in the claims of the present patent application. In other words, this description does not deny the possibility of which there are aspects of the present invention that are described in the embodiments but not described in the claims of the present patent application, namely aspects of the present invention that may be filed as divisional patent application(s) or aspects of the present invention that may be added as amendments.

Figure 3:
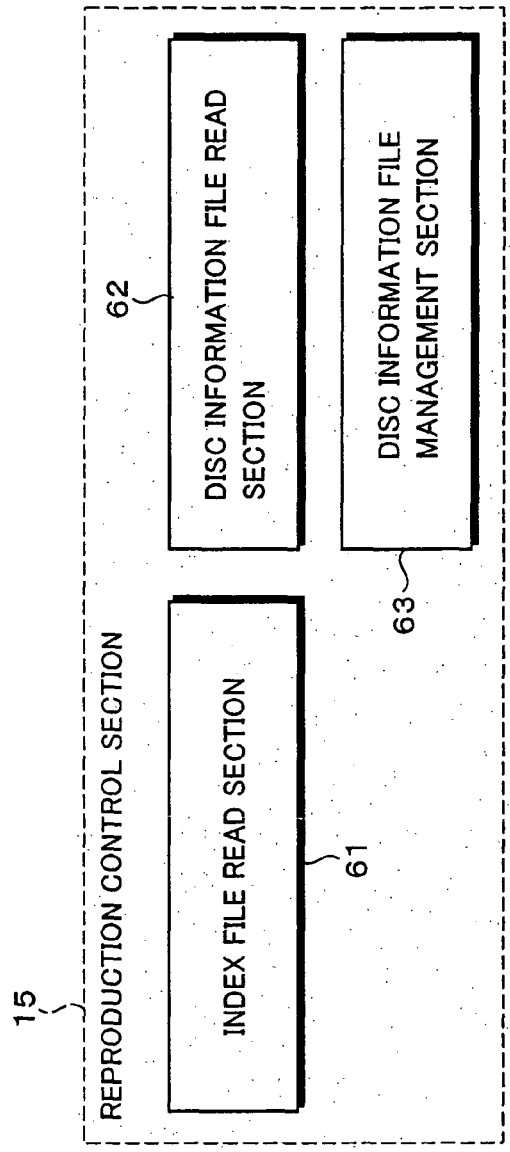
FIG. 3 is a block diagram showing an example of the detailed structure of a reproduction control section shown in FIG. 1.
Figure 4:
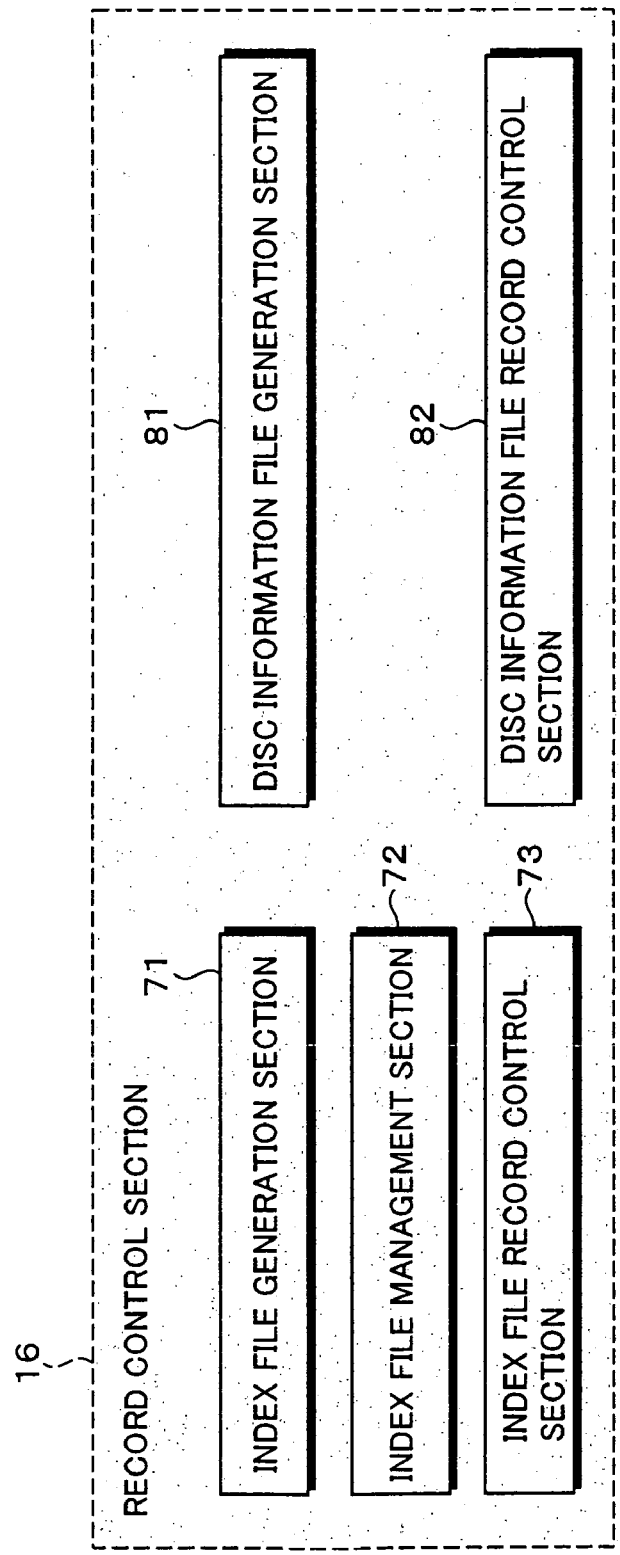
FIG. 4 is a block diagram showing an example of the detailed structure of a record control section shown in FIG. 1.

In one embodiment, information process apparatus (for example, a record and reproduction apparatus shown in FIG. 1) that performs a record and reproduction process for data, comprising:

reproduction means (for example, a reproduction control section shown in FIG. 1) for performing a reproduction process that reads and reproduces desired material data from a record medium (for example, a disc shown in FIG. 1) according to a management information file (for example, an index file shown in FIG. 12), the material data containing pictures and sound and the management information file managing a file of the material data being recorded on the record medium that is attachable and detachable to and from the information process apparatus;

generation means (for example, a disc information file generation section shown in FIG. 4) for generating reproduction history information about the reproduction process of the reproduction means, the reproduction history information composed of identification information of reproduced material data, information about a reproduction end position, and information about a reproduction method;

record means (for example, a disc information file record control section shown in FIG. 4) for recording a list of the reproduction history information generated by the generation means as one file (for example, a disc information file shown in FIG. 12) different from the management information file on the record medium;

read means (for example, a disc information file read section shown in FIG. 3) for reading the list of the reproduction history information recorded on the record medium by the record means:

reproduction command accepting means (for example, an input section shown in FIG. 1) for accepting a reproduction command for the material data; and reproduction control means (for example, a disc information file management section shown in FIG. 3) for referencing the list of the reproduction history information read by the read means, specifying material data to be reproduced and a reproduction start position according to reproduction history information according to a reproduction method designated by the reproduction command accepted by the reproduction command accepting means, controlling the reproduction means, and starting the reproduction process from the reproduction start position of the specified material data.

Figure 15:
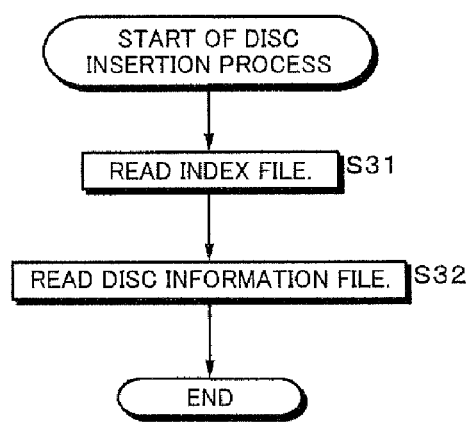
FIG. 15 is a flow chart describing a disc insertion process.
Figure 25:
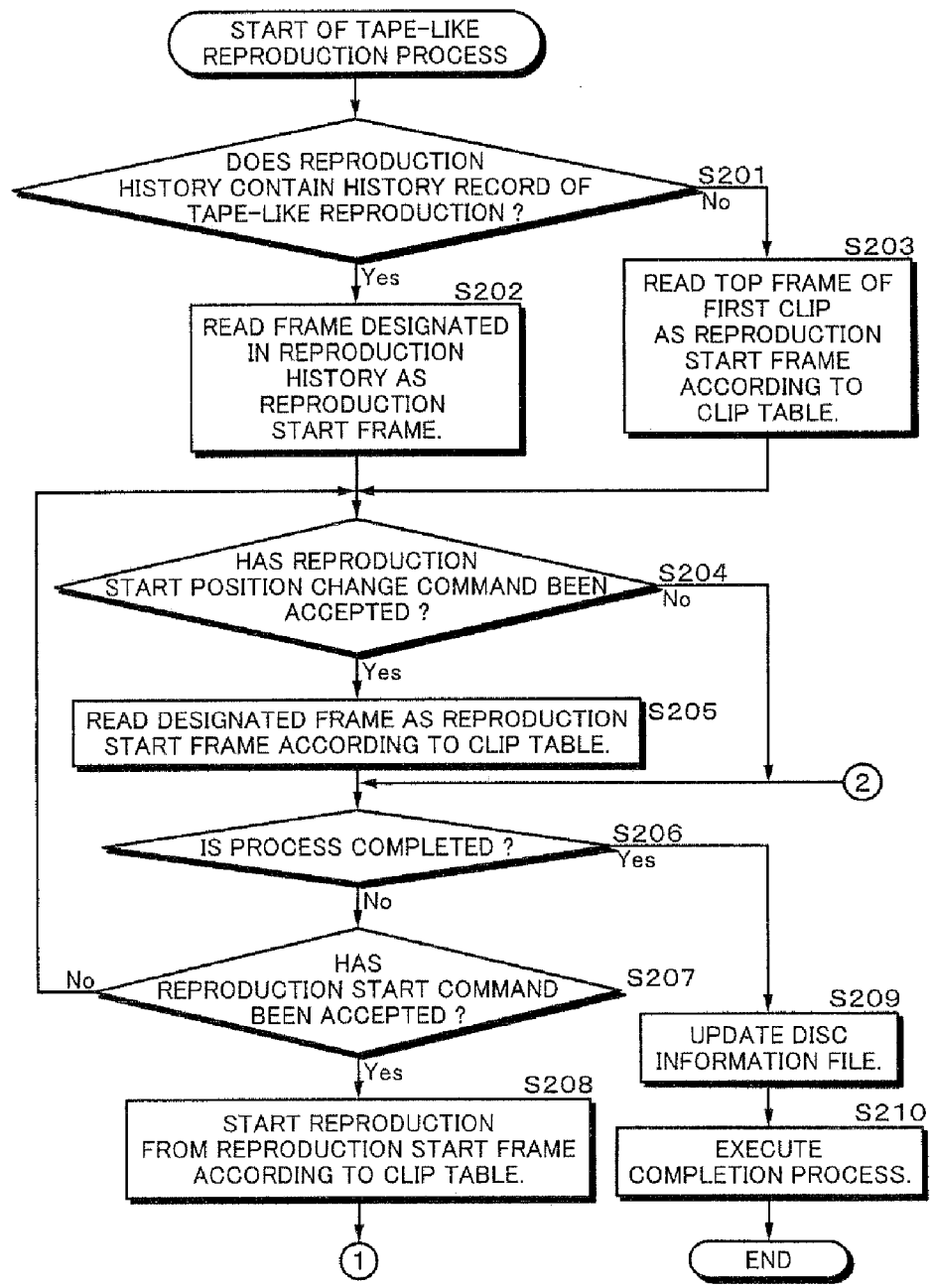
FIG. 25 is a flow chart describing a tape-like reproduction process.
Figure 26:
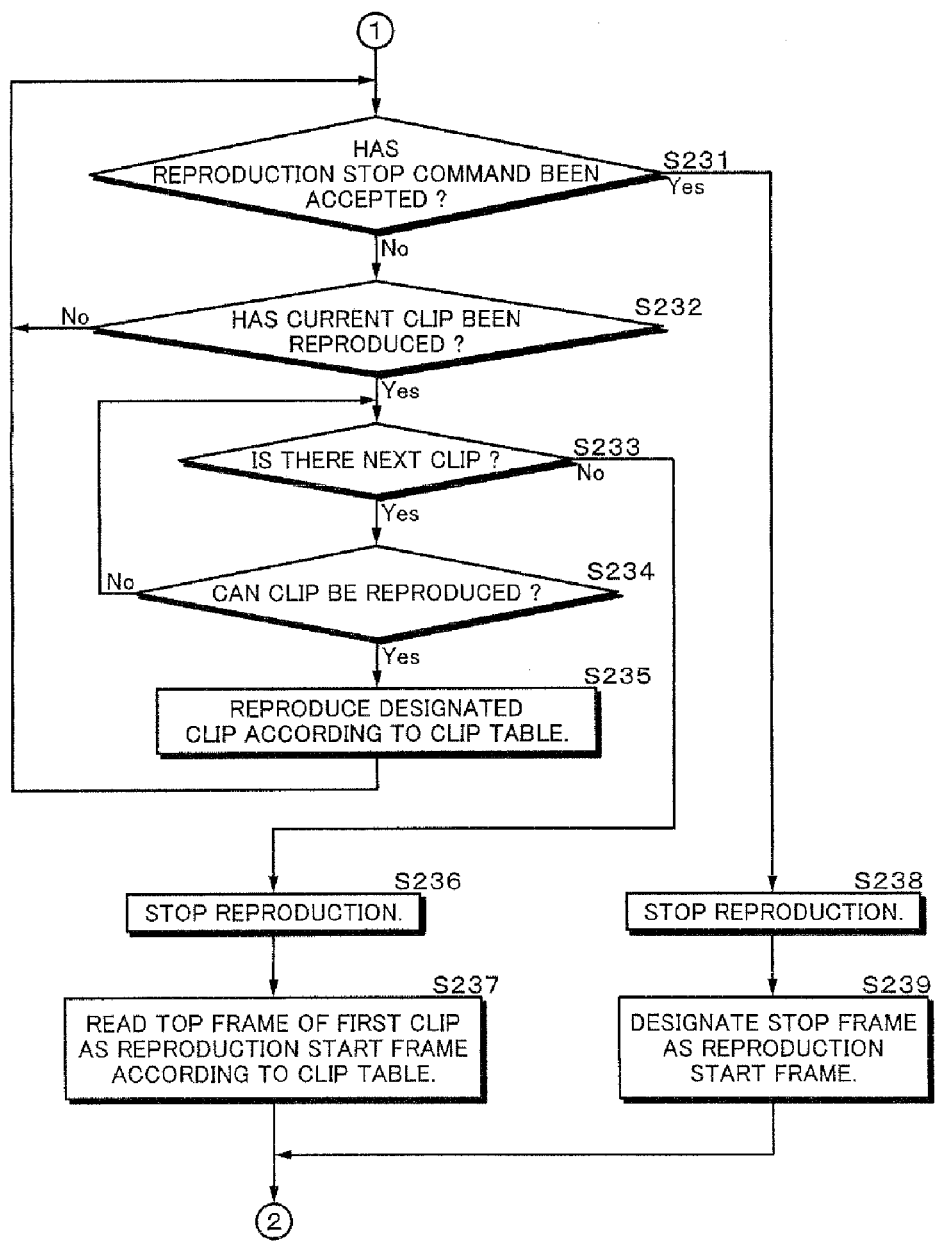
FIG. 26 is a flow chart describing the tape-like reproduction process, as a part preceded by FIG. 25.
Figure 31:
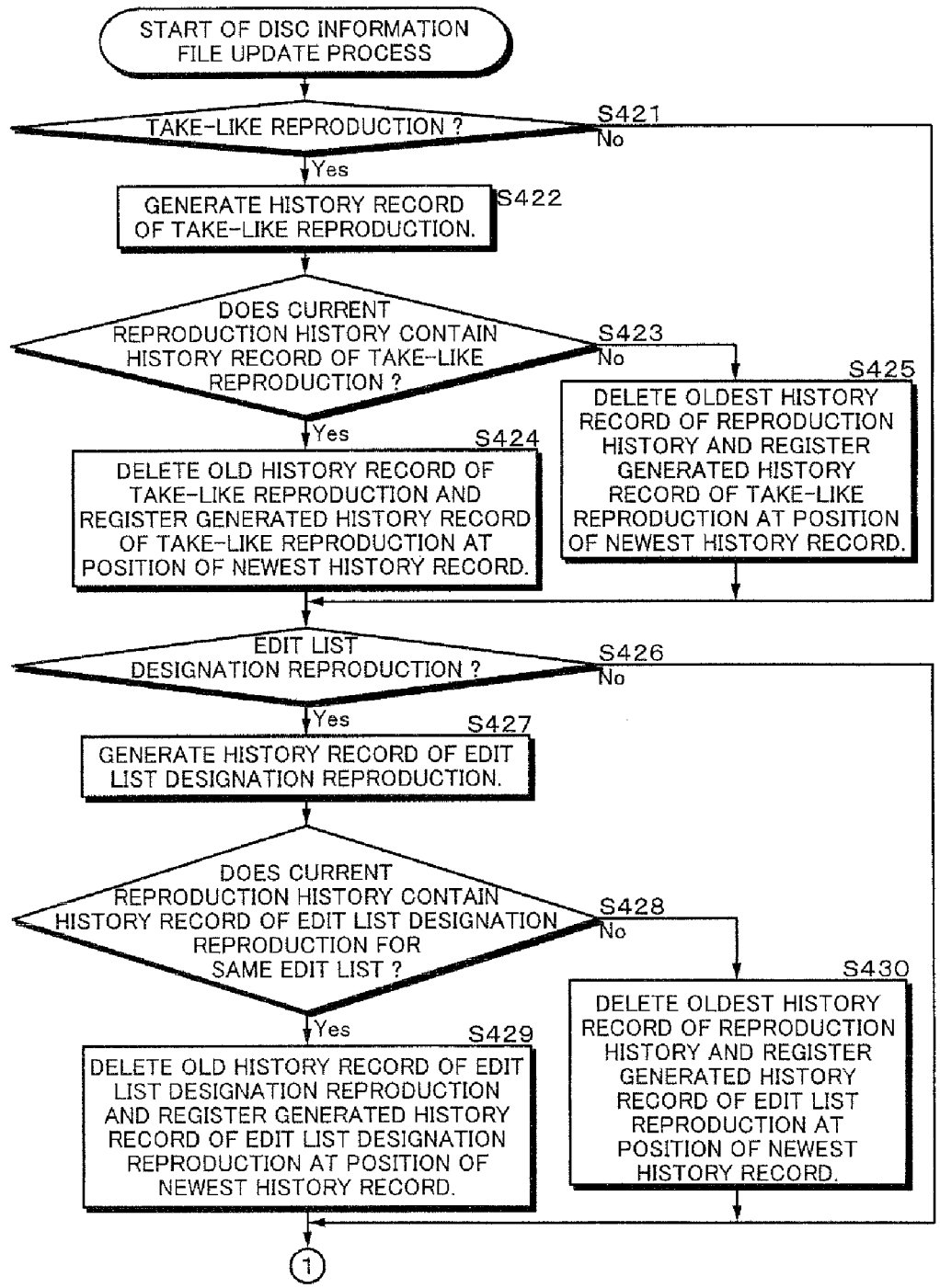
FIG. 31 is a flow chart describing a disc information file update process.
Figure 32:
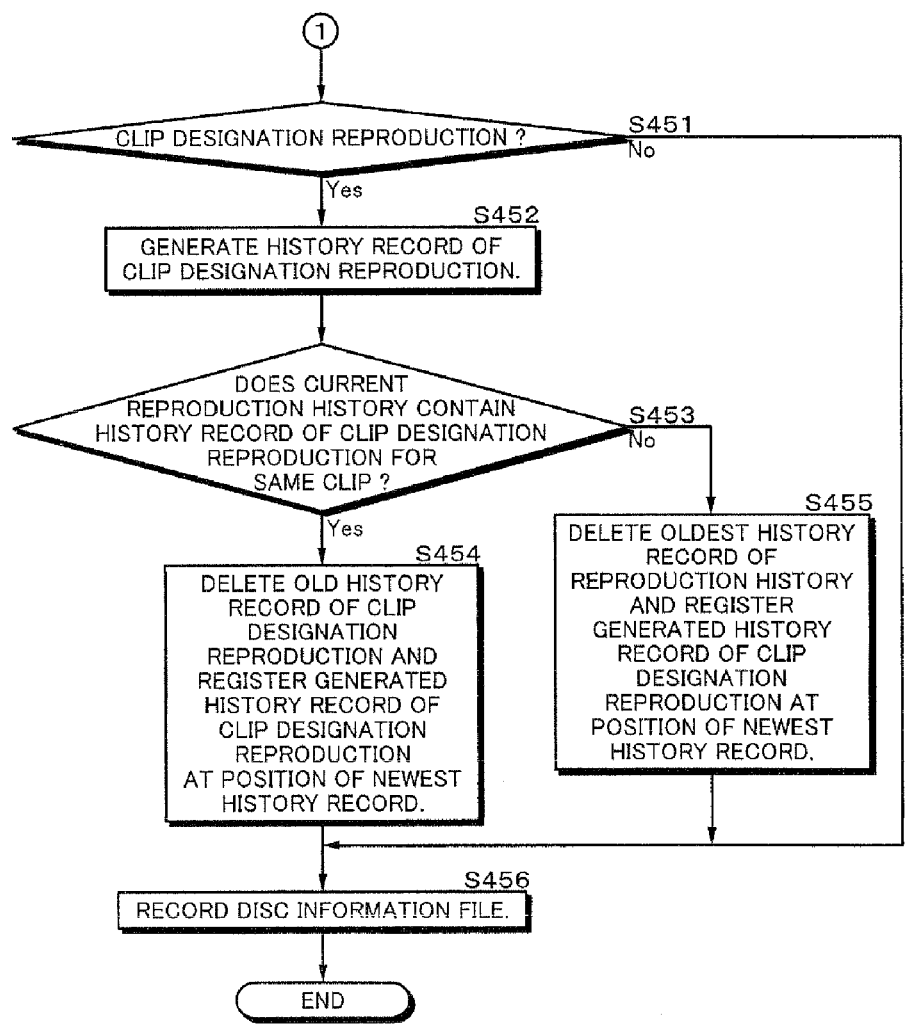
FIG. 32 is a flow chart describing the disc information file update process, as a part preceded by FIG. 31.

In another embodiment, an information process method for an information process apparatus (for example, a record and reproduction apparatus shown in FIG. 1) that performs a record and reproduction process for data, the method comprising the steps of:

causing a reproduction section to execute a reproduction process that reads and reproduces desired material data from a record medium (for example, a disc shown in FIG. 1) according to a management information file (for example, an index file shown in FIG. 12), the material data containing pictures and sound and the management information file managing a file of the material data being recorded on the record medium that is attachable and detachable to and from the information process apparatus (for example, at step S235 shown in FIG. 26);

generating reproduction history information about the reproduction process executed by a process of the reproduction step, the reproduction history information composed of identification information of reproduced material data, information about a reproduction end position, and information about a reproduction method (for example, at step S42 shown in FIG. 31);

recording a list of the reproduction history information generated by a process of the generation step as one file (for example, a disc information file shown in FIG. 12) different from the management information file on the record medium (for example, at step S456 shown in FIG. 32);

causing a read section to read the list of the reproduction history information recorded on the record medium by a process of the record step (for example, at step S32 shown in FIG. 15);

causing an accepting section to accept a reproduction command for the material data (for example, at step S207 shown in FIG. 25); and referencing the list of the reproduction history information read by a process of the read step, specifying material data to be reproduced and a reproduction start position according to reproduction history information according to a reproduction method designated by the reproduction command accepted by a process of the reproduction command accepting step, controlling an execution of a process of the reproduction step, and starting the reproduction process from the reproduction start position of the specified material data (for example, at step S208 shown in FIG. 25).

In yet another embodiment, a program that causes a computer (for example, a record and reproduction apparatus shown in FIG. 1) to perform a process that controls an information process apparatus that performs a record and reproduction process for data, the program comprising the steps of:

causing a reproduction section to execute a reproduction process that reads and reproduces desired material data from a record medium (for example, a disc shown in FIG. 1) according to a management information file (for example, an index file shown in FIG. 12), the material data containing pictures and sound and the management information file managing a file of the material data being recorded on the record medium that is attachable and detachable to and from the information process apparatus (for example, at step S235 shown in FIG. 26);

generating reproduction history information about the reproduction process executed by a process of the reproduction step, the reproduction history information composed of identification information of reproduced material data, information about a reproduction end position, and information about a reproduction method (for example, at step S422 shown in FIG. 31);

recording a list of the reproduction history information generated by a process of the generation step as one file (for example, a disc information file shown in FIG. 12) different from the management information file on the record medium (for example, at step S456 shown in FIG. 32);

causing a read section to read the list of the reproduction history information recorded on the record medium by a process of the record step (for example, at step S32 shown in FIG. 15);

causing an accepting section to accept a reproduction command for the material data (for example, at step S207 shown in FIG. 25); and referencing the list of the reproduction history information read by a process of the read step, specifying material data to be reproduced and a reproduction start position according to reproduction history information according to a reproduction method designated by the reproduction command accepted by a process of the reproduction command accepting step, controlling an execution of a process of the reproduction step, and starting the reproduction process from the reproduction start position of the specified material data (for example, at step S208 shown in FIG. 25).

Figure 1:
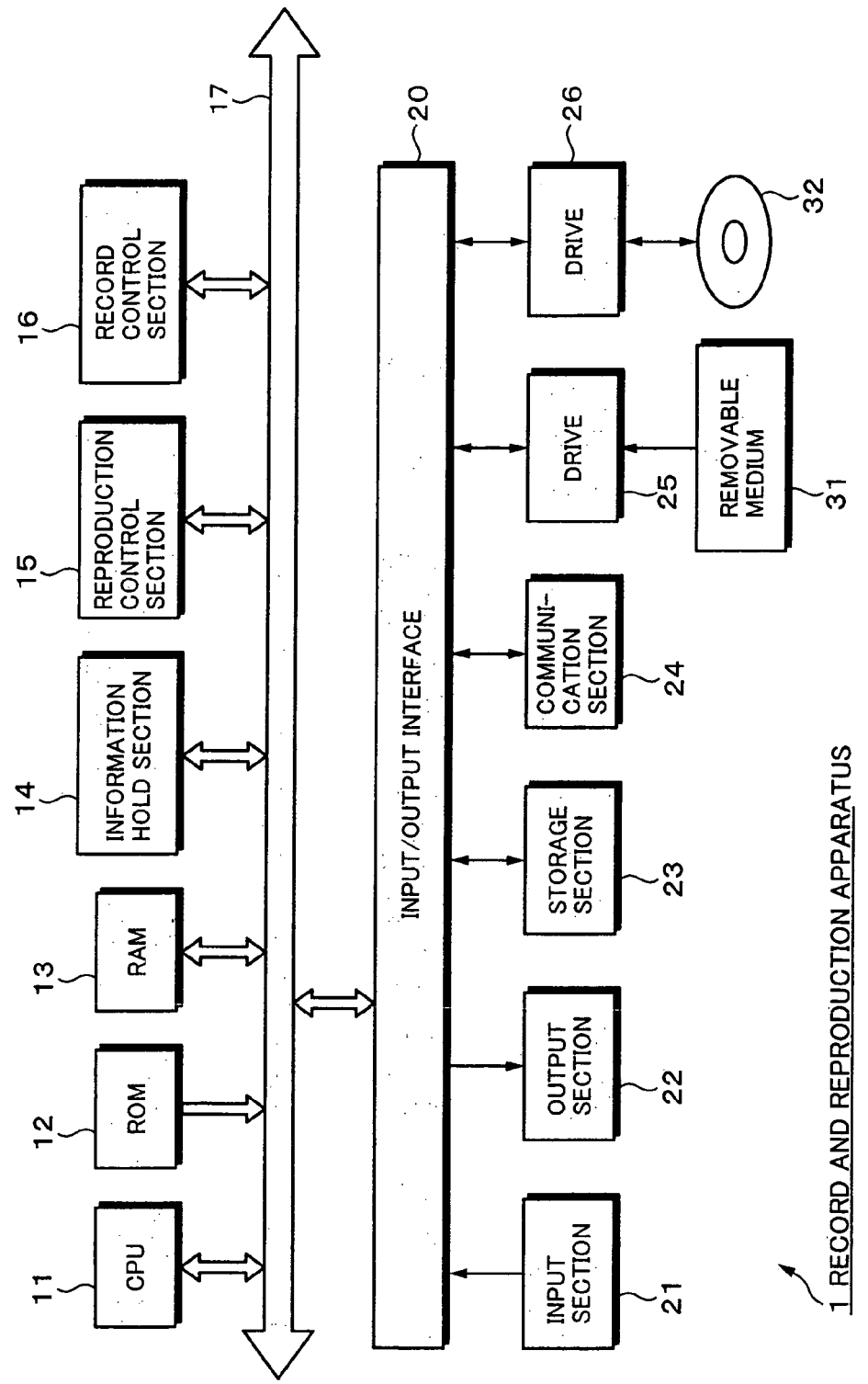
FIG. 1 is a schematic diagram showing an example of the structure of a record and reproduction apparatus according to the present invention.

In a further embodiment, a record medium (for example, a disc shown in FIG. 1) on which material data containing pictures and sound and a management information file (for example, an index file shown in FIG. 12) that manages a file of the material data are recorded, the material data and the management information file being reproduced by an information process apparatus (for example, a record and reproduction apparatus as shown in FIG. 1), reproduction history information about a reproduction process of the material data by the information process apparatus being recoded as one file (for example, a disc information file shown in FIG. 12) that is different from the management information file, the reproduction history information composed of identification information of reproduced material data, information about a reproduction end position, and information about a reproduction method.

Next, with reference to the accompanying drawings, an embodiment of the present invention will be described.

FIG. 1 is a block diagram showing an example of a record and reproduction apparatus according to the present invention.

In FIG. 1 a CPU (Central Processing Unit) 11 of the record and reproduction apparatus 1 executes various processes according to a program stored in a ROM (Read Only Memory) 12. When necessary, a RAM (Random Access Memory) 13 stores data, programs, and so forth necessary to execute various processes that the CPU 11 executes.

An information hold section 14 is a storage section that is composed of a semiconductor memory or the like that temporarily stores information. The information hold section 14 holds for example information about material data recorded on a disc 32, which will be described later, and read therefrom. The information hold section 14 is controlled by a reproduction control section 15, a record control section 16, and so forth so that the information hold section 14 provides its held information and obtains new information.

A reproduction control section 15 controls a drive 26 through a bus 17 and an input/output interface 20 to perform a process that controls the drive 26 to read various types of information from the disc 32 loaded into the drive 26. For example, the reproduction control section 15 executes a control process that for example reads information about data recorded on the disc 32 and supplies the information to the information hold section 14. The record control section 16 controls the drive 26 through the bus 17 and the input/output interface 20 to perform a process that controls writing of various types of information to the disc 32 loaded into the drive 26. For example, the record control section 16 executes a control process that for example records data held in the information hold section 14 on the disc 32.

The CPU 11, the ROM 12, the RAM 13, the information hold section 14, the reproduction control section 15, the record control section 16, are mutually connected through the bus 17. In addition, the input/output interface 20 is also connected to the bus 17.

Connected to the input/output interface 20 is an input section 21 composed of a keyboard and a mouse. A signal that is input to the input section 21 is output to the CPU 11. Connected to the input/output interface 20 is also an output section 22 composed of a display, a speaker, and so forth.

Connected to the input/output interface 20 are also a storage section composed of a hard disk, an EEPROM (Electronically Erasable and Programmable Read Only Memory), and so forth and a communication section 24 that communicate with another device through a non-wireless network, a wireless network, or the like. The drive 25 is used to read a program or data necessary to execute a program from a removable medium 31 composed of a record medium such as a magnetic disc, an optical disc, an optical-magnetic disc, a semiconductor memory, or the like and write data and a program thereto.

The drive 26 reads material data such as video data and audio data from the disc 32 loaded thereinto and records material data on the disc 32 loaded thereinto.

The disc 32 is an optical disc on which a large capacity of data. (for example, 27 Gigabytes) having a mark length of 0.14 μm (minimum) and a track pitch of 0.32 μm is recorded with a blue-purple laser having a numerical aperture (NA) of 0.85 and a wavelength of 405 nm. The optical disc 17 may be another type of a record medium. For example, the disc 32 may be one of various types of optical discs such as DVD-RAM (Digital Versatile Disc-Random Access Memory), DVD-R (DVD-Recordable), DVD-RW (DVD-ReWritable),.. DVD+R (DVD+Recordable), DVD+RW (DVD+ReWritable), CD-R (Compact Disc-Recordable), CD-RW (CD-ReWritable), or the like.

Figure 2:
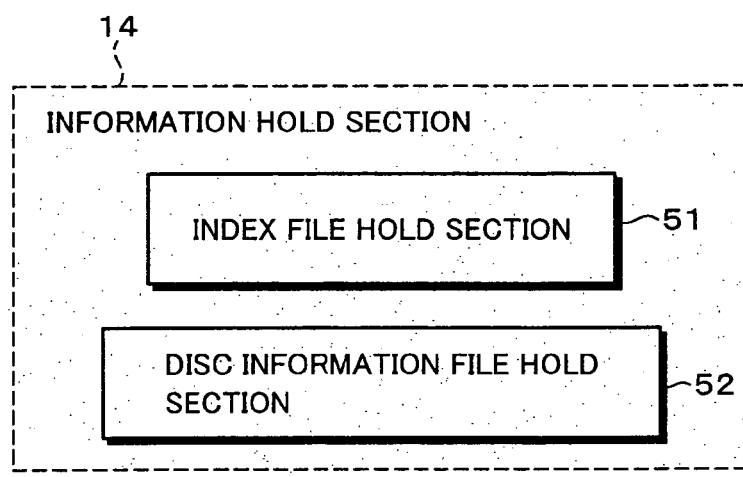
FIG. 2 is a block diagram showing an example of the detailed structure of an information hold section shown in FIG. 1.

FIG. 2 is a block diagram showing an example of the structure of the information hold section 14 shown in FIG. 1. In FIG. 2, the, information hold section 14 has an index file hold section 51 that holds an index file that manages information recorded on the disc 32 and a disc information file hold section 52 that holds a disc information file that contains reproduction history or the like of video data and audio data recorded on the disc 32. The information hold section 14 can also hold other information besides the foregoing information.

FIG. 3 is a block diagram showing an example of the detailed structure of the reproduction control section 15 shown in FIG. 1. In FIG. 3, the reproduction control section 15 has an index file read section 61 that executes a process that reads the index file from the disc 32 loaded into the drive 26 and causes the index file hold section 51 shown in FIG. 2 to hold the index file, a disc information file read section 62. that performs a process that reads the disc information file from the disc 32 loaded into the drive 26 and causes the disc information file 52 shown in FIG. 2 to hold the disc information file, and a disc information file management section 63 that performs a process that manages the disc information file read from the disc 32 and held in the disc information file hold section 52. The reproduction, control section 15 controls the drive 26 to read material data such as video data, audio data, and so forth from the disc 32 loaded into the drive 26 and reproduce the material data. In addition, the reproduction control section 15 controls the index file read section 61 and the disc information file read section 62 to read data other than the material data. Moreover, the reproduction control section 15 controls the disc information file management section 63 to manage these data that have been read and hold.

FIG. 4 is a block diagram showing an example of the detailed structure of the record control section 16 shown in FIG. 1. In FIG. 4, the record control section 16 has an index file generation section 71 that performs a process that generates the index file, an index file management section 72 that manages the index file held in the index file hold section 51, an index file record control section 73 that records the index file held in the index file hold section 51 on the disc 32 loaded into the drive 26, a disc information file generation section 81 that generates the disc information file and causes the disc information file hold section 52 to hold the disc information file, and a disc information file record control section 82 that executes a process that records the disc information file held in the disc information file hold section 52 on the disc 32. The record control section 16 controls the drive 26 to execute a process that records material data such as video data, audio data, and so forth on the disc 32 loaded into the drive 26. In addition, the record control section 16 executes a process that causes the index file generation section 71 to generate the index file, the index file management section 72 to manage the index file held in the index file hold section 51, and the drive 26 to record the index file held in the index file hold section 51 on the disc 32.

Figure 5:
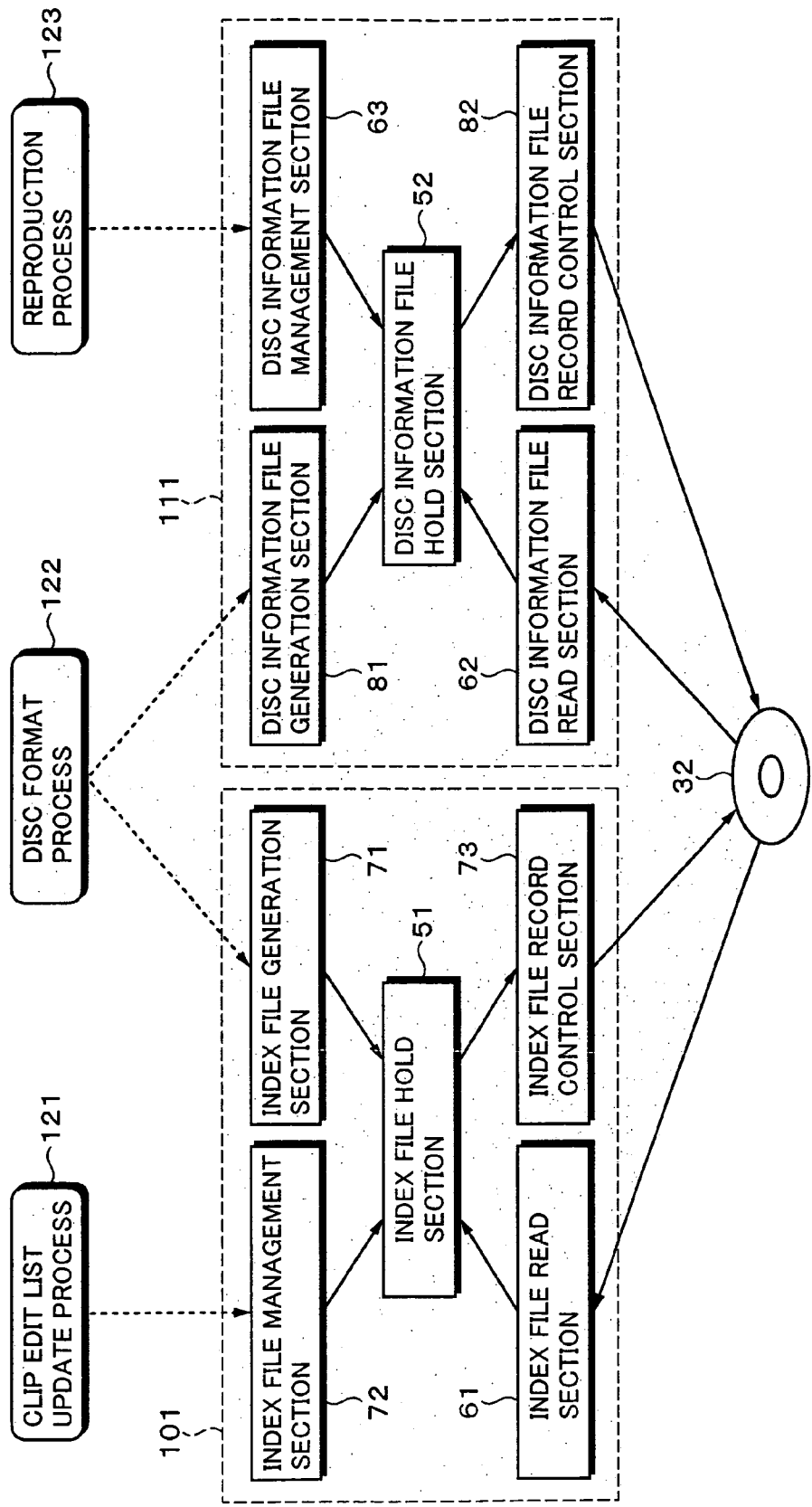
FIG. 5 is a functional block diagram showing the relationship of processes that each section shown in FIG. 2 to FIG. 4 perform.

Next, with reference to a block diagram shown in FIG. 5, the relationship among individual sections described with reference to FIG. 2 to 4 will be described.

An index process section 101 that performs a process for the index file is composed of the index file hold section 51, the index file read section 61, the index file generation section 71, the index file management section 72, and the index file record control section 73.

When a disc format process 122 is executed and a format process for the disc 32 is started, the index file generation section 71 generates the index file, which contains management information of files recorded on the disc 32. The generated index file is supplied to the index file record control section 73 through the index file hold section 51 and recorded on the disc 32 loaded into the drive 26.

When the disc 32 on which video data, audio data, and so forth are recorded is loaded into the drive 26, the index file read section 61 reads the index file from the disc 32 and causes the index file hold section 51 to hold the index file.

When a clip edit list update process 121 that updates video data and audio data recorded on the disc 32 is executed, the index file management section 72 manages and update the index file held in the index file hold section 51 as the video data and audio data are updated. The index file record control section 73 reads the updated index file from the index file hold section 51 and records the index file on the disc 32.

A clip is a unit that represents the number of times of a photographing process. Instead, a clip may be a unit that represents the duration after the photographing process starts until it stops. Instead, a clip may be a unit that represents the length of one of various types of data obtained in the photographing process. Instead, a clip may be a unit that represents a data amount of one of various types of data obtained in the photographing process. Instead, a clip may be a set of various types of data.

A disc information process section 111 that performs a process for the disc information file is composed of the disc information file hold section 52, the disc information file read section 62, the disc information file generation section 81, the disc information file management section 63, and the disc information file record control section 82.

When the disc format process 122 is executed and the format process for the disc 32 is started, the disc information file generation section 81 generates the disc information file, which contains a reproduction history of material data of video data, audio data, and so forth recorded on the disc 32. The generated disc information file is supplied to the disc information file record control section 82 through the disc information file hold section 52 and recorded on the disc 32 loaded into the drive 26.

When the disc 32 on which video data, audio data, and so forth are recorded is loaded into the drive 26, the disc information file read section 62 reads the disc information file from the disc 32 and causes the disc information file hold section 52 to hold the disc information file.

When a reproduction process 123 that reproduces material data recorded on the disc 32 is executed, the reproduction control section 15 references the reproduction history of the disc information file, which is held in the disc information file hold section 52, and starts reproducing material data from the position according to the reproduction history. When the reproduction control section 15 has completed the reproduction process, the disc information file management section 63 updates the reproduction history of the disc information file held in the disc information file hold section 52. The disc information file record control section 82 reads the updated disc information file from the disc information file hold section 52 and records the file on the disc 32.

As described above, according to each operation command, individual sections cooperatively perform processes and operations.

At this point, as described above, the disc information file, which contains the reproduction history, is updated in a process performed when material data are reproduced (have been completed) (the reproduction process 123). On the other hand, the index file, which is management information of files recorded on the disc 32, is updated along with a file that contains material data in a process performed when video data and audio data recorded on the disc 32 are updated (the clip edit list update process 121). In other words, the reproduction history (disc information file) is updated when various types of material data are reproduced, whereas the management information (index file) or the like is updated when material data are recorded. Thus, the update timing of the reproduction history is different from that of the management information.

In addition, material data that were edited once may be reproduced many times. The number of times of the reproduction process is larger than the number of times of the edit process. In addition, since the edit process is performed while reproduced material data are referenced, the reproduction process for material data is executed not only when the material data are reproduced, but when they are edited (recorded). In other words, normally, the reproduction process is more frequently performed than the record process.

Thus, as described above, when the reproduction history is managed as the disc information file that is different from other information such as management information of files recorded on the disc 32, when the record and reproduction apparatus 1 shown in FIG. 1 updates the reproduction history, the apparatus needs to update only the disc information file. Thus, the record and reproduction apparatus 1 does not need to update other unnecessary information. As a result, when the reproduction history is updated, other information can be prevented from being mistakenly destroyed.

In addition, since only the reproduction history is managed as an independent file, when the record and reproduction apparatus 1 shown in FIG. 1 updates the reproduction history, the data amount for which the record and reproduction apparatus 1 needs to update the can be decreased. Thus, the load of the update process can be lightened and the process time for the update process can be shortened. In other words, a resource such as a memory capacity necessary for the update process for the reproduction history can be decreased in comparison with the case of which the reproduction history and other information are recorded in the same file. As a result, the production cost of the record and reproduction apparatus 1 can be decreased.

Next, a specific flow of each of the foregoing processes will be described.

When the user operates the input section 21 or the like and designates the format process for the disc 32 loaded into the drive 26, individual sections of the record and reproduction apparatus 1 shown in FIG. 1 start the disc format process.

Next, with reference to a flow chart shown in FIG. 6, the disc format process will be described.

Firstly, at step S11, the record control section 16 executes a UDF (Universal Disk Format) format process for the disc 32 loaded into the drive 26 to perform a logical format process according to UDF. Thereafter, the flow advances to step S12. At step S12, the record control section 16 generates a ProAV directory under the root directory according to UDF on the disc 32 and records the ProAV directory on the disc 32. At step S13, the record control section 16 generates a clip root directory that contains files of material data of video data, audio data, and so forth and files of information about the material data and so forth under the ProAV directory and records the clip root directory on the disc 32. At step S14, the record control section 16 generates an edit root directory under the ProAV directory. The edit root directory contains an edit result (edit information) of which a clip that is a file group of material data and so forth, which are placed under the clip root directory, has been non-destructively edited. The record control section 16 records the edit root directory on the disc 32.

At step S15, the index file generation section 71 of the record control section 16 generates the index file according to XML (extensible Markup Language) and causes the index file hold section 51 to hold the index file. The index file record control section 73 records the index file held in the index file hold section 51 on the disc 32. Thereafter, the flow advances to step S16.

At step S16, the disc information file generation section 81 of the record control section 16 generates the disc information file according to XML and causes the disc information file hold section 52 to hold the disc information file. The disc information file record control section 82 records the disc information file held in the disc information file hold section 52 on the disc 32. Thereafter, the record control section 16 completes the disc format process.

When the disc format process is performed in the foregoing manner, since a reproduction history can be managed as the disc information file, which is a file different from other information such as management information or the like about files recorded on the disc 32. Thus, when the record and reproduction apparatus 1 shown in FIG. 1 updates a reproduction history, the record and reproduction apparatus 1 needs to update only the disc information file. As a result, when the record and reproduction apparatus 1 updates the reproduction history, other unnecessary information can be prevented from being mistakenly destroyed.

In addition, since only the reproduction history is managed as an independent file, when the record and reproduction apparatus 1 shown in FIG. 1 updates the reproduction history, the data amount for which the record and reproduction apparatus 1 needs to update the can be decreased. Thus, the load of the update process can be lightened and the process time for the update process can be shortened. In other words, a resource such as a memory capacity necessary for the update process for the reproduction history can be decreased in comparison with the case of which the reproduction history and other information are recorded in the same file. As a result, the production cost of the record and reproduction apparatus 1 can be decreased.

FIG. 7 to FIG. 10 show a specific example of the description of the index file. In FIG. 7 to FIG. 10, numerals that start with individual lines are added for convenience for explanation, not part of an XML description.

As described above, the index file is a file that manages information about files recorded on the disc 32. Specifically, the index file manages information of files under the ProAV directory generated at step S12 shown in FIG. 6. Information about these files is described from a start tag, line 2, FIG. 7 to an end tag, line 16, FIG. 10.

Clips contained under the clip directory are described as a clip table from a start tag, line 4, FIG. 7 to an end tag, line 24, FIG. 9. As shown in FIG. 7 to FIG. 9, in this case, four clips are contained under the clip root directory. A first clip is described from line 6, FIG. 7 to line 23, FIG. 7. A second clip is described from line 25, FIG. 7 to line 13, FIG. 8. A third clip is described from line 15, FIG. 8 to line 3, FIG. 9. A fourth clip is described from line 5, FIG. 9 to line 23, FIG. 9.

Common information about the first clip is described from line 6 to line 7, FIG. 7. Information about video data of the first clip is described from line 8 to line 9, FIG. 7. Information about individual channels of audio data is described from line 10 to line 17, FIG. 7.

Information about a sub stream that is material data composed of low resolution video data and audio data corresponding to the foregoing video data and audio data is described from line 18 to line 19, FIG. 7. Information about clip meta data as meta data added to a clip is described in line 20 and line 21, FIG. 7. Information about frame meta data added to each frame of video data of this clip is described in line 22, FIG. 7.

Like the first clip, information about each clip and information about files that composes each clip are described for the second clip to the fourth clip. These description will be omitted.

Thus, the index file contains information about clips recorded on the disc 32 and information about files that compose each clip is recorded as a clip table on the disc 32.

In addition, edit lists contained under the edit list root directory are described as an edit list table from a start tag, line 25, FIG. 9 to an end tag; line 15, FIG. 10. As shown in FIG. 7 to FIG. 10, in this case, four edit lists are contained under the edit list root directory. A first edit list is described from line 26, FIG. 9 to line 1, FIG. 10. A second edit list is described from line 2, FIG. 10 to line 5, FIG. 10. A third edit list is described from line 6, FIG. 10 to line 9, FIG. 10. A fourth edit list is described from line 10, FIG. 10 to line 14, FIG. 10.

In this manner, the index file contains information about edit lists recorded on the disc 32 as an edit list table.

Figure 6:
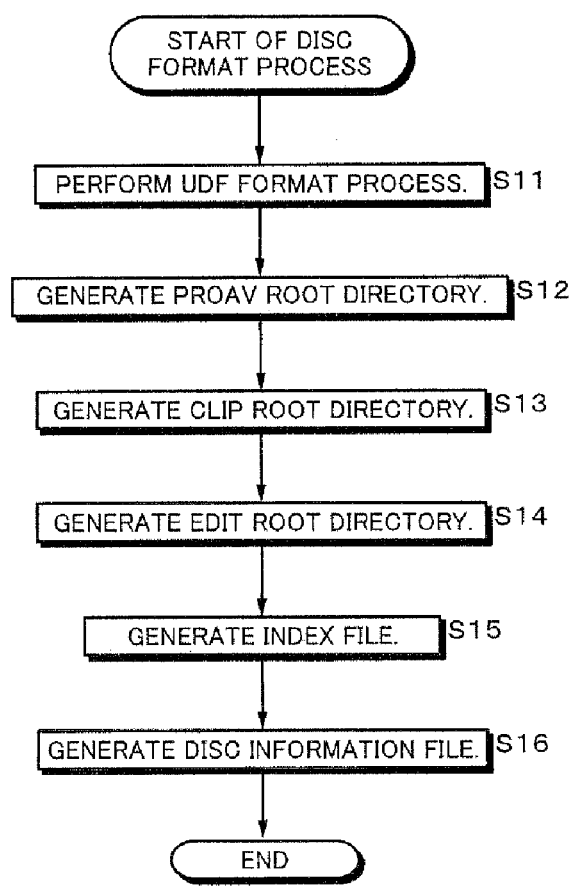
FIG. 6 is a flow chart describing a disc format process.

When the process at step S15 shown in FIG. 6 is preformed, the index file described according to XML is generated as shown in FIG. 7 to FIG. 10 and recorded on the disc 32. When the process at step S15 shown in FIG. 6 is performed, since clips and edit lists have not been recorded on the disc 32, information about clips and edit lists shown in FIG. 7 to FIG. 10 are not present. Thus, after the record and reproduction apparatus 1 records clips and edit lists on the disc 32, the apparatus 1 can read the index file from the disc 32 and obtain information about clips and edit lists recorded on the disc 32.

FIG. 11 shows a specific example of a description of the disc information file. In FIG. 11, numerals that start with individual lines are added for convenience of explanation, not part of an XML description.

As described above, the disc information file is a file that manages the reproduction history of material data such as clips, edit list, and so forth recorded on the disc 32. Such a reproduction history is described from a start tag, line 2, FIG. 11 to an end tag, line 11.

For example, line 4, FIG. 11, describes that a clip designation reproduction that is a reproduction for each clip was performed. In addition, line 4 describes the end position (the frame number of video data) of the reproduction. In other words, in this case, clip [C0003] stopped at position [00:30:12:23] (frames). [00:30:12:23] represents a time code (FTC: File Time Code) in the unit of a clip. The top frame (first frame) of a clip is [00:00:00:00]. In other words, in the case shown in FIG. 11, clip [C0003]stopped at 30 minutes, 12 seconds, and 23 frames after the top frame.

Line 5, FIG. 11, describes that an edit list designation reproduction that is a reproduction in the unit of an edit list was performed. In addition, line 5 describes the end position (frame number) of the reproduction. In other words, in this case, this line represents that edit list [E0001] was stopped at position [00:00:00:15] (frames). Since an edit list is an edit result of clips, the edit list may deal with a plurality of clips. In this case, when the edit list designation reproduction is performed, a plurality of clips (a part thereof) are reproduced. However, FTC recorded as a reproduction history is a time code for an edit result of one clip. Thus, even if a plurality of clips are reproduced, frames are counted in the condition that the top frame (the top frame of a clip reproduced first) is [00:00:00:00]. As a result, even if a clip that is reproduced is changed to another clip, the value of FTC of the reproduction history is not returned to [00:00:00:00].

Line 6, FIG. 11, describes that a tape-like reproduction that successively reproduces all clips recorded on the disc 32 as if they were recorded on a tape device was performed. In addition, line 6 describes the end position (frame number of video data) of the reproduction. In other words, in this case, this line represents that that clip [C0003] was stopped at position [00:02:23:12] (frames). In this case, FTC recorded as a reproduction history is a time code for each clip. Thus, even if a clip that is reproduced is changed to another clip, the value of FTC of the reproduction history is not returned to [00:00:00:00].

Likewise, line 7, FIG. 11 describes history information of the edit list designation reproduction. Line 8 and line 9 each describe history information of the clip designation reproduction.

In such a manner, the disc information file contains six records of a reproduction history of material data of clips, edit lists, and so forth recorded on the disc 32. However, the number of records of the reproduction history contained in the disc information file is not restricted.

Records of the reproduction history described from line 4 to line 9 are arranged in the descending order (from the newest record to the oldest record). In other words, the record of the history in line 9 is the oldest, whereas the record of the history in line 4 is the newest. When a new record of the history is registered, the oldest record is deleted. In the reproduction history, a plurality of records of the same clip or same edit list reproduced in the same reproduction method are not present. In other words, the foregoing six records of the reproduction history are different either in reproduction methods or in clips or edit lists that were reproduced. When a record that is the same as the currently registered record is newly registered, the older record is deleted.

When the process at step S16 shown in FIG. 6 is performed, the disc information file according to XML as shown in FIG. 11 is generated and recorded on the disc 32.

Thus, since a reproduction history is managed as the disc information file that is a file different from other information such as the index file, when the record and reproduction apparatus 1 shown in FIG. 1 updates the reproduction history, the record and reproduction apparatus 1 needs to update only the disc information file. Thus, when the record and reproduction apparatus 1 updates the reproduction history, other unnecessary information can be prevented from being mistakenly destroyed.

In addition, since only the reproduction history is managed as an independent file, when the record and reproduction apparatus 1 shown in FIG. 1 updates the reproduction history, the data amount for which the record and reproduction apparatus 1 needs to update the can be decreased. Thus, the load of the update process can be lightened and the process time for the update process can be shortened. In other words, a resource such as a memory capacity necessary for the update process for the reproduction history can be decreased in comparison with the case of which the reproduction history and other information are recorded in the same file. As a result, the production cost of the record and reproduction apparatus 1 can be decreased.

When the process at step S16 shown in FIG. 6 is preformed, clips and edit lists have not been recorded on the disc 32. Thus, there is no reproduction history of the clips and edit lists. As a result, the reproduction history of the disc information file that is generated is blank. With the disc information file generated in such a manner, the reproduction history is recorded on the disc 32. When the record and reproduction apparatus 1 reproduces clips or edit lists with the reproduction history, even if the reproduction process is stopped and the disc 32 is unloaded from the drive 26, the record and reproduction apparatus 1 can resume the reproduction process from the stop position (frame).

Next, a file system that manages each type of data recorded on the optical disc 32 and the directory structure and files of the file system will be described.

Data recorded on the disc 32 are managed according to a file system such as UDF. The file system is not limited to UDF. Instead, as long as the file system with which the record and reproduction apparatus can deal, any file system such as ISO9660 (International Organization for Standardization 9660) may be used. When a magnetic disc such as a hard disk is used instead of the disc 32, as a file system, FAT (File Allocation Tables), NTFS (New Technology File System), HFS (Hierarchical File System), or UFS (Unix (registered trademark) System), or the like may be used. Instead, a dedicated file system may be used.

Figure 12:
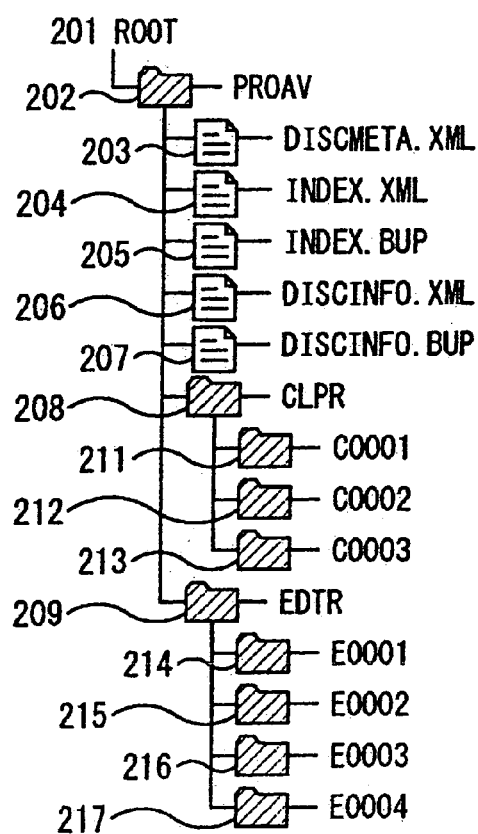
FIG. 12 is a schematic diagram showing an example of the directory structure of a disc shown in FIG. 1.
Figure 13:
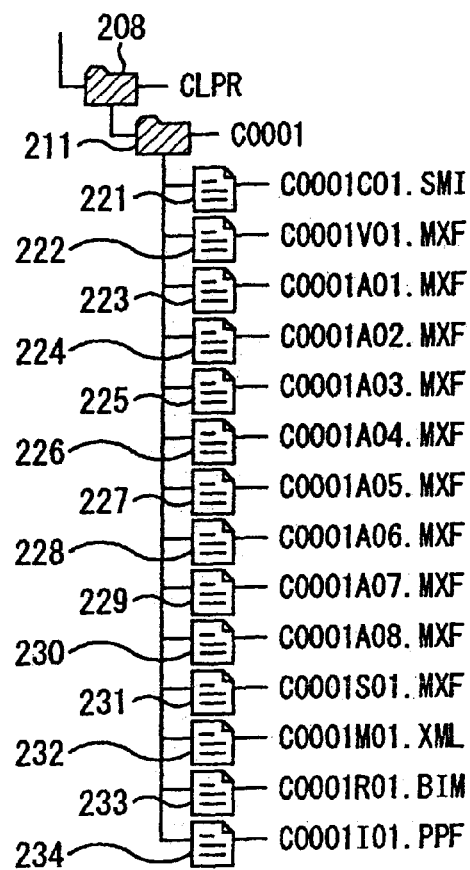
FIG. 13 is a schematic diagram showing an example of the more detailed directory structure of the directory structure shown in FIG. 12.
Figure 14:
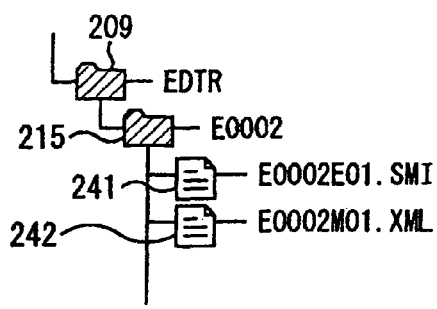
FIG. 14 is a schematic diagram showing an example of the more detailed structure of the directory structure shown in FIG. 12.

In the file system, data recorded on the disc 32 are managed with a directory structure and files shown in FIG. 12 to FIG. 14.

In FIG. 12, under a root directory (ROOT) 201, a PROAV directory 202 is placed. Under the PROAV directory 202, directories for information about material data of video data, audio data, and so forth, edit lists that represent edit results of material data, and so forth are placed.

Under the PROAV directory 202, a disc meta file (DISC-META.XML) 203 that is a file that contains titles and comments of all material data recorded on the disc 32 and information such as a path to video data corresponding to a representative picture as a representative frame of all video data recorded on the disc 32, an index file (INDEX.XML) 204 that contains management information and so forth with which all clips and edit lists recorded on the disc 32 are managed, and an index file (INDEX.BUP) 205 are placed. The index file 205 is a copy of the index file 204. With the two files, the reliability is improved.

Under the PROAV directory 202, a disc information file (DISCINFO.XML) 206 that is a file that contains meta data of all data recorded on the disc 32, for example information such as a reproduction history and a disc information file (DISCINFO.BUP) 207 are placed. The disc information file 207 is a copy of the disc information file 206. With the two files, the reliability is improved.

Besides these files, under the PROAV directory 202, a clip root directory, (CLPR) 208 whose lower directory contains data of clips and an edit list root directory (EDTR) 209 whose lower directory contains data of edit lists are placed.

Under the clip root directory 208, data of clips recorded on the disc 32 are managed with directories corresponding to clips. For example, in the case shown in FIG. 12, data of three clips are managed with three directories that are a clip directory (C0001) 211, a clip directory (C0002) 212, and a clip directory (C0003) 213. In other words, each type of data of the first clip recorded on the disc 32 is managed as a file in a lower directory of the clip directory 211. Each type of data of the second clip recorded in the disc 32 is managed as a file in a lower directory of the clip directory 212. Each type of data of the third clip recorded on the disc 32 are managed as a file in a lower directory of the clip directory 213.

Under the edit list root directory 209, edit lists recorded on the disc 32 are managed with directories corresponding to edit processes. In the case shown in FIG. 12, four edit lists are managed with four directories that are an edit list directory (E0001) 214, an edit list directory (E0002) 215, an edit list directory (E0003) 216, and an edit list directory (E0004) 217. In other words, an edit list that represents the first edit result of a clip recorded on the disc 32 is managed as a file in a lower directory of the edit list directory 214. An edit list that represents the second edit result is managed as a file in a lower directory of the edit list directory 215. An edit list that represents the third edit result is managed as a file in a lower directory of the edit list directory 216. An edit list that represents the fourth edit result is managed as a file in a lower directory of the edit list directory 217.

A lower directory of the clip directory 211 under the clip root directory 208 contains and manages each type of data of a clip recorded first on the disc 32 as files shown in FIG. 13.

In the case shown in FIG. 13, the clip directory 211 contains a clip information file (C0001C01.SMI) 221 that is a file with which the clip is managed, a video data file (C0001V01.MXF) 222 that is a file contains video data of the clip, eight audio data files (C0001A01.MXF to C0001A08.MXF) 223 to 230 that are eight files that contain audio data of individual channels of the clip, a low resolution data file (C0001S01.MXF) 231 that is a file that contains low resolution data corresponding to video data of the clip, a clip meta data file (C0001M01.XML) 232 that is a file that contains clip meta data as meta data that do not need to be in real time corresponding to material data of the clip, a frame meta data file (C0001R01.BIM) 233 that is a file that contains frame meta data that are meta data that need to be in real time corresponding to material data of the clip, a picture pointer file (C0001I01.PPF) 234 that is a file that describes the frame structure of the video data file 222 (for example, information about the compression format of each picture in MPEG or the like and information such as an offset address from the beginning of the file), and so forth.

In the case shown in FIG. 13, video data, low resolution data, and frame meta data that are data that need to be reproduced in real time are managed as different files so that their read times do not increase.

Likewise, audio data need to be reproduced in real time. To deal with audio data of multi channels such as 7.1 channels, eight channels are provided. They are managed as different files. In other words, audio data are managed as eight files. Instead, files for audio data may be seven files or less or nine files or larger.

Likewise, when necessary, video data, low resolution data, and frame metadata may be managed as two or more files each.

In FIG. 13, clip meta data that do not need to be in real time are managed as a file different from frame meta data that need to be in real time. This is because meta data are prevented from being unnecessarily reproduced while video data and so forth are being normally reproduced. Thus, the process time for the reproduction process can be shortened and the load of the process can be lightened.

To allow the clip meta data file 232 to have versatility, the clip meta data file 232 is described in the XML (extensible Markup Language) format. However, to shorten the process time for the reproduction process and lighten the load for the process, the frame meta data file 233 is a BIM format file of which an XML format file has been compiled.

The example of the structure of the files in the clip directory 211 shown in FIG. 13 can be applied to all clip directories of clips recorded on the disc 32. In other words, the example of the structure of the files shown in FIG. 13 can be applied to the other directories 212 and 213 shown in FIG. 12. Thus, their description will be omitted.

Each file contained in a clip directory for one clip was described. However, the structure of files is not limited to the foregoing example. Instead, any structure may be used as long as a clip meta data file of a clip is contained in a lower director of each clip directory.

Next, an example of the structure of files contained in a lower directory of the edit list root directory 209 shown in FIG. 12 will be described. A lower directory of the edit list directory 215 under the edit list root directory 209 contains and manages data of an edit list that is information about the second edit result of each type of data of a clip recorded on the disc 32 as files shown in FIG. 14.

In the case shown in FIG. 14, the edit list directory 215 contains an edit list file (E0002E01.SMI) 241 that is a file with which the edit result (edit list) is managed and an edit list clip meta data file (E0002M01.XML) 242 that is a file that contains clip meta data corresponding to the edited material data (a portion extracted as edited data from material data of all clips used in the edit) or clip meta data newly generated according to the clip meta data.

As will be described later, the edit list clip meta data file 242 is a file that contains clip meta data newly generated according to the edited result, namely clip meta data of an edited clip (a clip meta data file contained in a lower directory of the clip root directory 208). For example, when a clip is edited, a portion corresponding to the edited essence data is extracted from the clip meta data contained in the clip meta data file 232 shown in FIG. 13. With the extracted portion, new clip meta data is re-generated as one clip of the edited material data and managed as an edit list clip meta data file. In other words, new clip meta data that are one clip of the edited essence data are added to the edited material data and the clip meta data are managed as one edit list clip meta data file. Thus, the edit list clip meta data file is generated whenever a clip is edited.

To allow the edit list clip meta data file 242 to have versatility, it is described in the XML format.

The forgoing example of the structure of the files in the edit list directory 215 shown in FIG. 14 can be applied to all edit lists (edit results). In other words, the example of the structure of the files shown in FIG. 14 can be applied to the other edit list directory 214, 216, or 217 shown in FIG. 12. Thus, the description of these directories will be omitted.

Each file contained in the edit list directory corresponding to one edit operation was described. However, the structure of files is not limited to the foregoing example. Instead, any structure may be applied as long as an edit list clip meta data file corresponding to an edit operation is contained in a lower directory of each edit list directory.

As described above, since a reproduction history is managed as the disc information file that is a file different from other information such as the index file, when the record and reproduction apparatus 1 updates the reproduction history, the apparatus 1 needs to update only the disc information file. Thus, when the record and reproduction apparatus 1 updates the reproduction history, other unnecessary information can be prevented from being mistakenly destroyed.

In addition, since only the reproduction history is managed as an independent file, when the record and reproduction apparatus 1 shown in FIG. 1 updates the reproduction history, the data amount for which the record and reproduction apparatus 1 needs to update the can be decreased. Thus, the load of the update process can be lightened and the process time for the update process can be shortened. In other words, a resource such as a memory capacity necessary for the update process for the reproduction history can be decreased in comparison with the case of which the reproduction history and other information are recorded in the same file. As a result, the production cost of the record and reproduction apparatus 1 can be decreased.

Next, a process performed at timing of which the index file is updated will be specifically described.

As described above, when a clip and an edit list recorded on the disc 32 are updated, the index file is updated. First of all, the user or the like loads the disc 32 into the drive 26 of the record and reproduction apparatus 1 shown in FIG. 1. When the drive 26 detects the disc 32, the record and reproduction apparatus 1 performs a process shown in a flow chart of FIG. 15, stores the index file recorded on the disc 32 to the index file hold section 51, and obtains the structure of clips, edit lists, and so forth recorded on the disc 32.

With reference to the flow chart shown in FIG. 15, a disc insertion process executed when the user inserts (loads) the disc 32 into the drive 26 will be described.

When the disc 32 is inserted into the drive 26, the flow advances to step S31. At step S31, the index file read section 61 of the record and reproduction apparatus 1 reads the index file from the disc 32 through the drive 26, supplies the index file to the index file hold section 51, and causes the index file hold section 51 to hold the index file.

Thereafter, at step S32, the disc information file read section 62 reads the disc information file from the disc 32 through the drive 26 and causes the disc information file hold section 52 to hold the disc information file. After the disc information file has been read, each section of the record and reproduction apparatus 1 completes the disc insertion process.

Instead, the disc information file may not be read in the disc insertion process. In this case, when the record and reproduction apparatus 1 references the disc information file or updates it, the disc information file read section 61 may read the disc information file in the same manner as the process at step S32.

As described above, the index file is a file that manages information about clips and edit lists recorded on the disc 32. Thus, the index file is updated when a clip is added, updated, or deleted or when an edit list is added, updated, or deleted.

Figure 16:
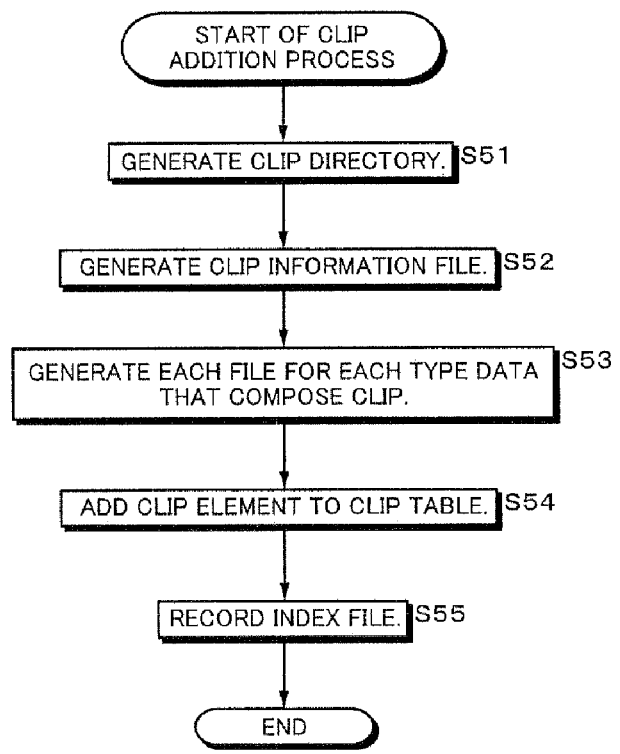
FIG. 16 is a flow chart describing a clip addition process.

Firstly, with reference to a flow chart shown in FIG. 16, a clip addition process that is executed when a clip is added will be described. When necessary, with reference to FIGS. 17 and 18, the process will be described.

When the user or the like issues a command that causes a new clip to be added to the disc 32, the flow advances to step S51. At step S51, the record control section 16 of the record and reproduction apparatus 1 generates a new clip directory under the clip root directory of the disc 32. At this point, the clip directory name is assigned so that it does not become redundant to existing clip directory names.

Thereafter, the flow advances to step S52. At step S52, the record control section 16 generates a clip information file under the clip directory generated in the process at step S51.

FIG. 17 and FIG. 18 are schematic diagrams showing a specific example of a description of a clip information file according to XML. In FIGS. 17 and 18, numerals starting with individual lines are added for convenience of explanation, not part of an XML description.

As was described above, the clip information file is a file that manages information about other files contained in the same clip directory as the clip information file. The clip information file also describes reproduction methods for these files.

As shown in FIG. 17 and FIG. 18, the XML description of the clip information file is mainly composed of a header portion surrounded by header tags (<head> </head>) and a body portion surrounded by body tags (<body> </body>). In the case shown in FIG. 17 and FIG. 18, the header portion is described from line 3, FIG. 17 to line 10, FIG. 17. The body portion is described from line 11, FIG. 17 to line 23, FIG. 18.

The header portion describes information about a clip meta data file contained in the same clip directory. The body portion describes information about the other files (not the clip meta data file) contained in the same clip directory along with the reproduction methods of these files.

For example, line 6 to line 8, FIG. 17, describe information about the clip meta data file. Line 16 to line 18, FIG. 17, describe information about a video data file. Line 19 to line 21, FIG. 17, describe information about an audio data file of channel 1. Line 22 to line 24, FIG. 17, describe information about an audio data file of channel 2. Line 25 to line 27, FIG. 17, describe information about an audio data file of channel 3. Line 28, FIG. 17 to line 18, FIG. 18, describe information about an audio data file of channel 4. Line 2 to line 4, FIG. 18, describe information about an audio data file of channel 5. Line 5 to line 7, FIG. 18, describe information about an audio data file of channel 6. Line 8 to line 10, FIG. 18, describe information about an audio data file of channel 7. Line 11 to line 13, FIG. 18, describe information about an audio data file of channel 8.

Line 16 to line 18, FIG. 18, describe information about a low resolution data file as a sub stream. Line 21, FIG. 18, describes information about a frame meta data file.

As described above, the XML description of the clip information file describes information about other files contained in the same clip directory.

Returning to FIG. 16, at step S53, the record control section 16 generates files for individual types of material data that compose the clip under the clip directory generated in the process at step S51. When the clip to be added is composed of video data, audio data, and clip meta data, the record control section 16 records the video data, audio data, and clip meta data as different files.

After the record control section 16 has completed the process at step S53, the flow advances to step S54. At step S54, the index file management section 72 of the record control section 16 adds information of the added clip to the clip table of the index file held in the index file hold section 51 (hereinafter, the information of the added clip is referred to as a clip element).

When the clip table of the index file held in the index file hold section 51 has been updated according to the addition of the clip, the flow advances to step S55. At step S55, the index file record control section 73 overwrites (updates) the updated index file on the existing index file recorded on the disc 32. After the index file record control section 73 has updated the index file on the disc 32, the index file record control section 73 completes the clip addition process.

When a clip is added in the foregoing manner, the index file recorded on the disc 32 is updated.

Figure 19:
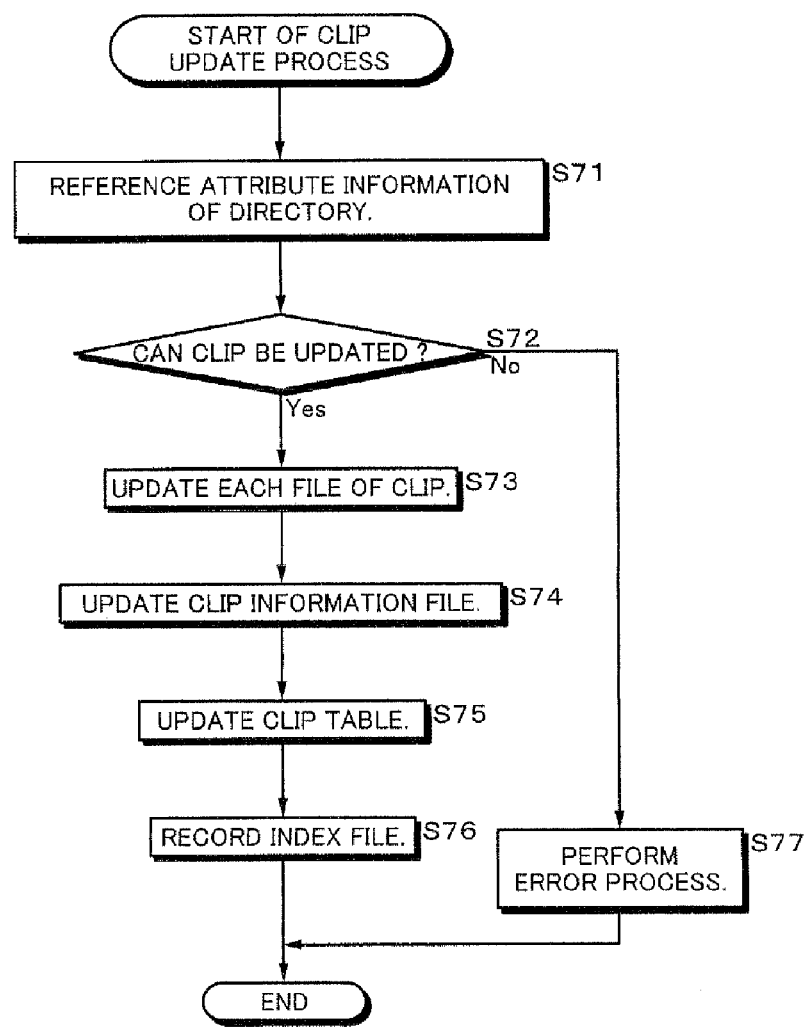
FIG. 19 is a flow chart describing a clip update process.

Next, with reference to a flow chart shown in FIG. 19, a clip update process executed when a clip is updated will be described.

After a process that substantially edits material data of a clip is preformed (hereinafter, this process is referred to as the destructive edit), when the user or the like issues a command that causes a clip recorded on the disc 32 to be overwritten (updated), the flow advances to step S71. At step S71, the record control section 16 of the record and reproduction apparatus 1 references attribute information of a clip directory of the clip to be overwritten that the file system such as UDF manages. Thereafter, the flow advances to step S72. At step S72, the record control section 16 determines whether the clip can be updated. When the determined result represents that the clip can be updated because the attribute of the clip directory of the clip to be overwritten is for example "write permitted," the flow advances to step S73. At step S73, the record control section 16 updates each file that contains material data and so forth of the clip. Thereafter, the flow advances to step S74. At step S74, the record control section 16 updates the clip information file according to the updates of the files.

After the record control section 16 has updated the files under the clip directory, the flow advances to step S75. At step S75, the index file management section 72 of the record control section 16 updates the clip table of the index file held in the index file hold section 51.

After the index file management section 72 has updated the clip table of the index file held in the index file hold section 51 according to the update of the clip, the flow advances to step S76. At step S76, the index file record control section 73 obtains the updated index file from the index file hold section 51 and records the obtained index file on the disc 32 so that the obtained index file is overwritten on the index file recorded on the disc 32. After the index file record control section 73 has recorded the index file on the disc 32, the index file record control section 73 completes the clip update process.

When the determined result at step S72 represents that the clip cannot be updated because the attribute of the clip directory of the clip to be overwritten is for example "write prohibited," the flow advances to step S77. At step S77, the record control section 16 performs an error process for example that causes the display device to display alarm information through the output section 22 and completes the clip update process.

When a clip is updated in the foregoing manner, the index file recorded on the disc 32 is updated.

In addition, as described above, when a clip is updated, with reference to attribute information of a clip directory of the clip to be processed, the record control section 16 can easily determine whether the designated clip can be overwritten.

Figure 20:
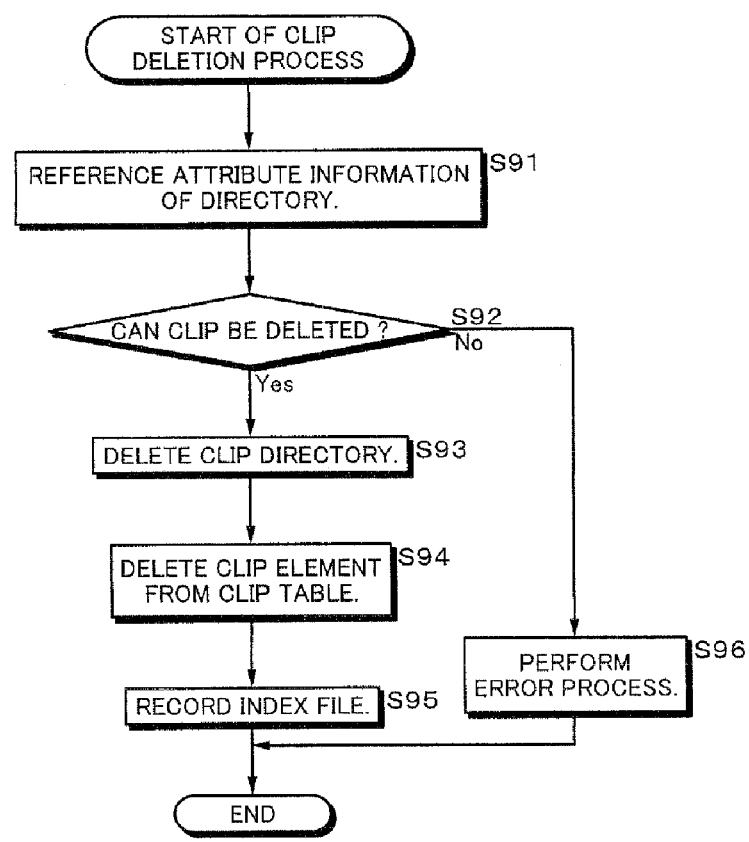
FIG. 20 is a flow chart describing a clip deletion process.

Next, with reference to a flow chart shown in FIG. 20, a clip deletion process executed when a clip is deleted will be described.

When the user or the like issues a command that causes a clip to be deleted from the disc 32, the flow advances to step S91. At step S91, the record control section 16 of the record and reproduction apparatus 1 references attribute information of a clip directory of the clip to be deleted that the file system such as UDF manages. Thereafter, the flow advances to step S92. At step S92, the record control section 16 determines whether the clip can be deleted. When the determined result represents that the clip can be deleted because the attribute of the clip directory of the clip to be deleted is for example "write permitted," the flow advances to step S93. At step S93, the record control section 16 deletes the clip directory (and all files contained in the clip directory).

When the record control section 16 has deleted the clip directory along with all files under the clip directory, the flow advances to step S94. At step S94, the index file management section 72 of the record control section 16 deletes a clip element corresponding to the deleted clip directory from the clip table of the index file held in the index file hold section 51.

When the index file management section 72 has updated the clip table of the index file held in the index file hold section 51 has been updated according to the deletion of the clip, the flow advances to step S95. At step S95, the index file record control section 73 obtains the updated index file (an index file from which a clip element corresponding to the deleted clip directory has been deleted) from the index file hold section 51 and records the obtained index file on the disc 32 so that the obtained index file is overwritten on the index file recorded on the disc 32. After the index file record control section 73 has recorded the index file on the disc 32, the index file record control section 73 completes the clip deletion process.

When the determined result at step S92 represents that the clip cannot be deleted because the attribute of the clip directory of the clip to be deleted is for example "write prohibited," the flow advances to step S96. At step S96, the record control section 16 performs an error process for example that causes the display device to display alarm information through the output section 22 and completes the clip deletion process.

When a clip is deleted in the foregoing manner, the index file recorded on the disc 32 is updated.

As described above, when a clip is deleted, with reference to attribute information of a clip directory of the clip to be processed, the record control section 16 can easily determine whether the designated clip can be deleted.

Figure 21:
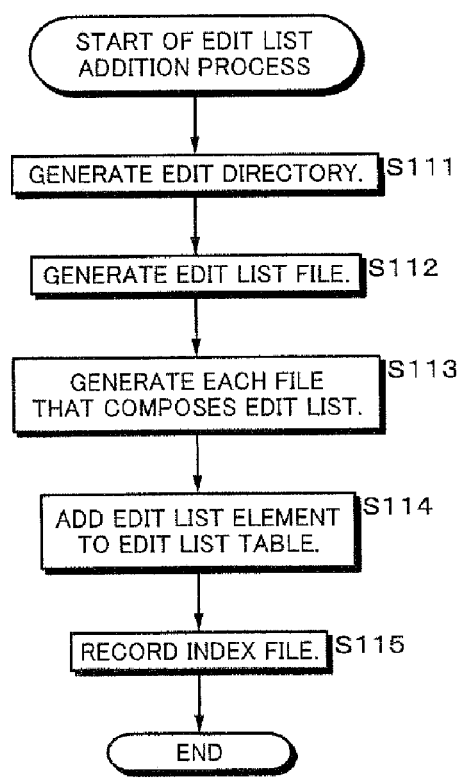
FIG. 21 is a flow chart describing an edit list addition process.

Next, with reference to a flow chart shown in FIG. 21, an edit list addition process executed when an edit list is added will be described. When necessary, with reference to FIG. 22, the process will be described.

After a clip recorded on the disc 32 has been edited in the manner that original material data are not updated, when a process that generates an edit list as edit information as the edit result has been performed (hereinafter, this process is referred to as the non-destructive edit), when the user or the like issues a command that causes a new edit list to be added to the disc 32, the flow advances to step S111. At step S111, the record control section 16 of the record and reproduction apparatus 1 generates a new edit list directory under the root directory of the disc 32. At this point, the edit list directory name is designated so that it does not become redundant to the existing edit list directory names.

Thereafter, the flow advances to step S112. At step S112, the record control section 16 generates an edit list file under the edit list directory generated in the process at step S111.

FIG. 22 is a schematic diagram showing a specific example of a description of an edit list file according to XML. In FIG. 22, numerals starting with individual lines are added for convenience of explanation, not part of an XML description.

As described above, an edit list file is a file that contains edit information of a non-destructive edit result of clips along with a reproduction method of the edit result.

As shown in FIG. 22, the XML description of the edit list file is mainly composed of a header portion surrounded by header tags (<head></head>) and a body portion surrounded by body tags (<body></body>). In the case shown in FIG. 22, the header portion is described from line 3 to line 10, FIG. 22. The body portion is described from line 11 to line 24.

The header portion describes information about an edit list meta data file contained in the same edit list directory. The body portion describes information of the edit result along with a reproduction method. In the case shown in FIG. 22, the body portion describes that an edit is performed so that two clips of first clip (clip 1) and second clip (clip 2) are connected.

In other words, line 12 and line 23, FIG. 22 describe parallel tags (<par> <par>) that represent that clips surrounded by the tags are successively reproduced. Line 14 to line 17 describe information about the first clip. Line 19 to line 22 describe information about the second clip.

As described above, the XML description of the edit list file describes edit information of a non-destructive edit result of a clip.

Returning to FIG. 21, at step S113, the record control section 16 generates files that compose an edit list (other than an edit list file) such as an edit list meta data file under the edit list directory generated in the process at step S111.

After the record control section 16 has completed the process at step S113, the flow advances to step S114. At step S114, the index file management section 72 of the record control section 16 adds information about the added edit list to the edit list table of the index file held in the index file hold section 51 (hereinafter, this information is referred to as an edit list element).

When the index file management section 72 has updated the edit list table of the index file held in the index file hold section 51 according to the addition of the edit list, the flow advances to step S115. At step S115, the index file record control section 73 records the updated index file held in the index file hold section 51 on the disc 32 so that the updated index file is overwritten on the existing index file of the disc 32 (the existing index file on the disc 32 is updated). After the index file record control section 73 has updated the index file on the disc 32, the index file record control section 73 completes the edit list update process.

When an edit list is updated in the foregoing manner, the index file recorded on the disc 32 is updated.

Figure 23:
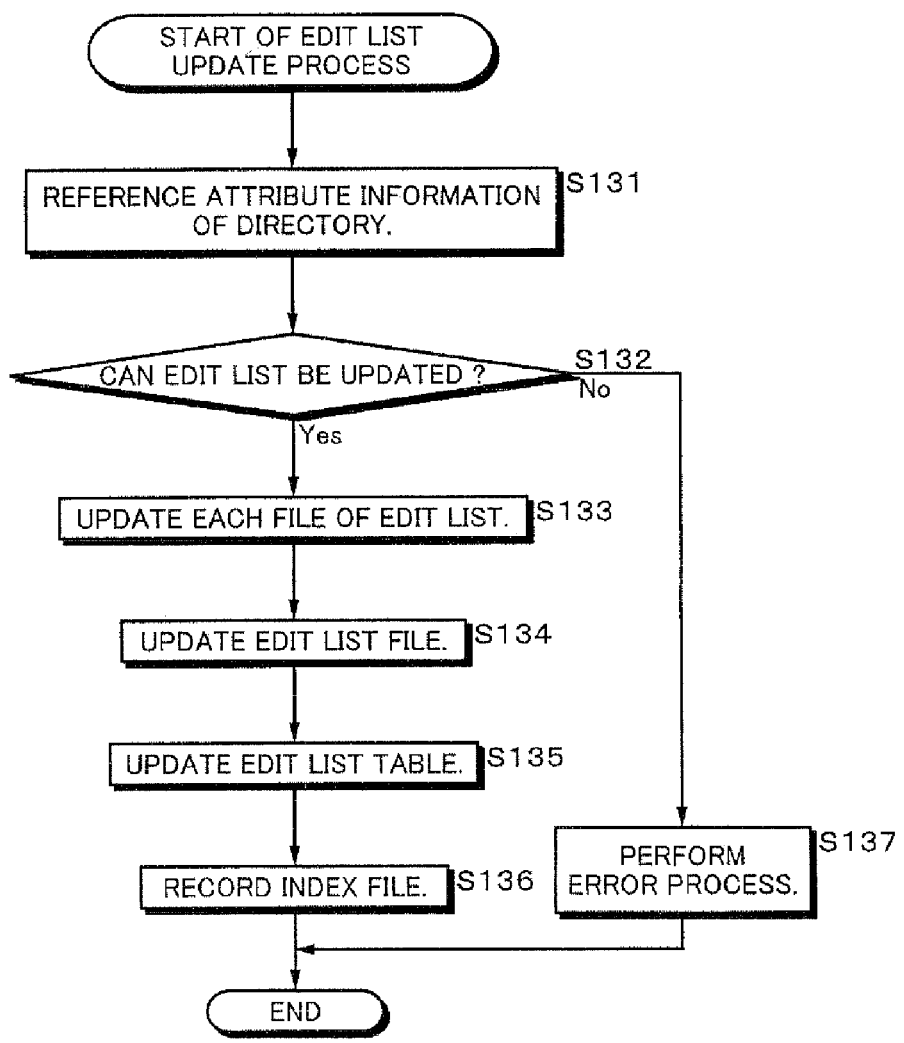
FIG. 23 is a flow chart describing an edit list update process.

Next, with reference to a flow chart shown in FIG. 23, an edit list update process executed when an edit list is updated will be described.

After the record and reproduction apparatus 1 has edited an existing edit list file on the disc 32, when the user or the like issues a command that causes an edit list on the disc 32 to be overwritten (updated), the flow advances to step S131. At step S131, the record control section 16 of the record and reproduction apparatus 1 references attribute information of an edit list directory of the edit list to be overwritten that the file system such as UDF manages. At step S132, the record control section 16 determines whether the edit list can be updated. When the determined result represents that the edit list can be updated because the attribute of the edit list directory of the edit list to be overwritten is for example "write permitted," the flow advances to step S133. At step S133, the record control section 16 updates files of the edit list other than the edit list file. Thereafter, the flow advances to step S134. At step S134, the record control section 16 updates the edit list file according to the updates of these files.

After the record control section 16 has updated files under the edit list directory, the flow advances to step S135. At step S135, the index file management section 72 of the record control section 16 updates the edit list table of the index file held in the index file hold section 51.

After the index file management section 72 has updated the edit list table of the index file held in the index file hold section 51 according to the update of the edit list, the flow advances to step S136. At step S136, the index file record control section 73 obtains the updated index file from the index file hold section 51 and records the obtained index file on the disc 32 so that the updated index file is overwritten on the corresponding index file recorded on the disc 32. After the index file record control section 73 has recorded the index file on the disc 32, the index file record control section 73 completes the edit list update process.

When the determined result at step S132 represents that the edit list cannot be updated because the attribute of the edit list directory of the edit list to be overwritten is for example "write prohibited," the flow advances to step S137. At step S137, the record control section 16 performs an error process for example that causes the display device to display alarm information through the output section 22 and completes the edit list update process.

When an edit list is updated, the index file recorded on the disc 32 is updated.

As described above, when an edit list is updated, with reference to attribute information of an edit list directory of the edit list to be processed, the record control section 16 can easily determine whether the designated edit list can be overwritten.

Figure 24:
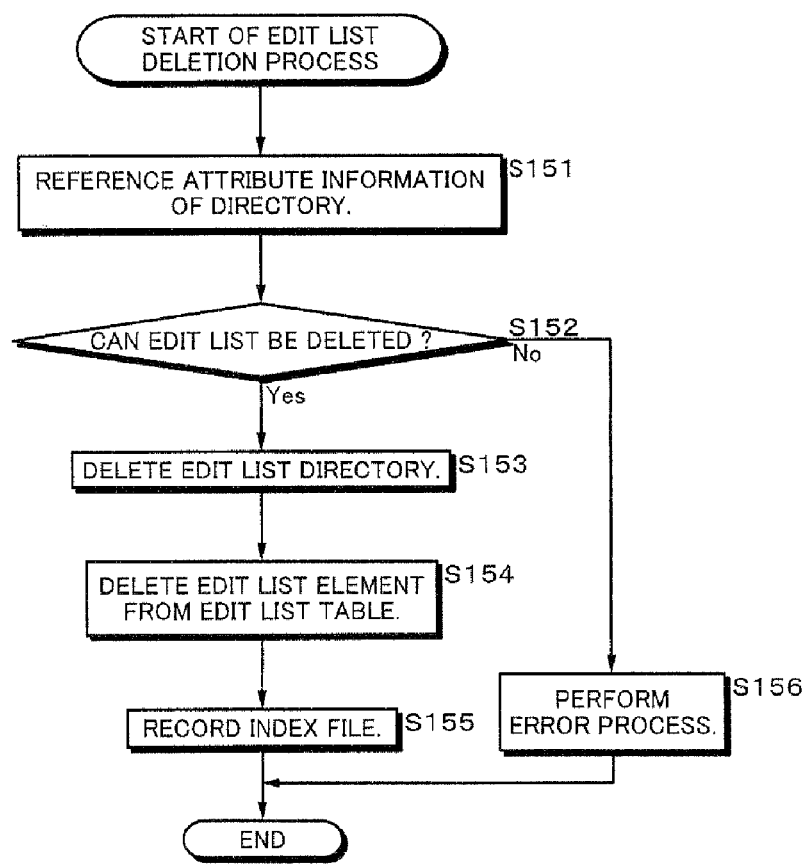
FIG. 24 is a flow chart describing an edit list deletion process.

Next, with reference to a flow chart shown in FIG. 24, an edit list deletion process executed when an edit list is deleted will be described.

When the user or the like issues a command that causes an edit list to be deleted from the disc 32, the flow advances to step S151. At step S151, the record control section 16 of the record and reproduction apparatus 1 references attribute information for an edit list directory for the edit list to be deleted that the file system such as UDF manages. Thereafter, the flow advances to step S152. At step S152, the record control section 16 determines whether the edit list can be deleted. When the determined result represents that the edit list can be deleted because the attribute of the edit list directory of the edit list to be deleted is for example "write permitted," the flow advances to step S153. At step S153, the record control section 16 deletes the edit list directory (and all files contained under the edit list directory).

After the record control section 16 has deleted the files under the edit list directory along therewith, the flow advances to step S154. At step S154, the index file management section 72 of the record control section 16 deletes an edit list element corresponding to the deleted edit list directory from the edit list table of the index file held in the index file hold section 51.

After the index file management section 72 has updated the edit list table of the index file held in the index file hold section 51 according to the deletion of the edit list, the flow advances to step S155. At step S155, the index file record control section 73 obtains an updated index file (an index file from which an edit list element corresponding to the deleted edit list directory has been deleted) from the index file hold section 51 and records the obtained index file on the disc 32 so that the obtained index file is overwritten on the corresponding index file recorded on the disc 32. After the index file record control section 73 has recorded the index file on the disc 32, the index file record control section 73 completes the edit list deletion process.

When the determined result at step S152 represents that the edit list directory cannot be deleted because the attribute of the edit list directory of the edit list to be deleted is for example "write prohibited," the flow advances to step S156. At step S156, the record control section 16 performs an error process for example that causes the display device to display alarm information through the output section 22 and completes the edit list deletion process.

When an edit list is deleted in the foregoing manner, the index file recorded on the disc 32 is updated.

As described above, when an edit list is deleted, with reference to attribute information of an edit list directory of the edit list to be processed, the record control section 16 can easily determine whether the designated edit list can be deleted.

Next, a process performed at timing of which the disc information file is updated will be specifically described.

As described above, the disc information file is a file that manages a reproduction history of clips and edit lists recorded on the disc 32. Thus, the disc information file is updated when a reproduction process such as the tape-like reproduction, the edit list designation reproduction, the clip designation reproduction, or the like is completed.

Firstly, with reference to a flow chart shown in FIGS. 25 and 26, the tape-like reproduction process executed when all clips recorded on the disc 32 are successively reproduced as if they were recorded on a tape device will be described.

When the user or the like issues a command for the tape-like reproduction, the flow advances to step S201. At step S201, the disc information management section 63 reference the disc information file held in the disc information file hold section 52 of the information hold section 14 and determines whether the reproduction history of the disc information file contains a record history of the tape-like reproduction.

When the disc has been inserted into the drive, if the disc information file has not been read therefrom, the flow advances to step S201. At step S201, the disc information file read section 62 performs a process that reads a history record of the tape-like reproduction from the disc information file on the disc 32. The disc information management section 63 determines whether the reproduction history contains a history record of the tape-like reproduction depending on whether the disc information file read section 62 has read a history record of the tape-like reproduction from the disc information file.

When the determined result at step S201 shown in FIG. 25 represents that the reproduction history contains a history record of the tape-like reproduction, the flow advances to step S202. At step S202, the reproduction control section 15 reads a frame designated in the reproduction history as a reproduction start frame from the disc 32. Thereafter, the flow advances to step S204.

When the determined result at step S201 represents that the reproduction history does not contain a history record of the tape-like reproduction, the flow advances to step S203. At step S203, the reproduction control section 15 reads the top frame of the first clip as a reproduction start frame from the disc 32 according to the clip table of the index file held in the index file hold section 51. Thereafter, the flow advances to step S204.

The first clip is a clip designated as a clip to be reproduced first in the XML description of the index file shown in FIG. 7 to FIG. 10. The top frame is a frame designated as a frame to be reproduced first in the XML description of the index file. Thus, the first frame is not always a frame that is reproduced first in material data of a clip. Thus, if the XML description of the index file describes that the reproduction for a clip starts from a middle frame, this frame is the first frame.

At step S204, the reproduction control section 15 determines whether the reproduction start position change command has been accepted. When the user has operated the input section 21 and inputted the reproduction start position change command, the reproduction control section 15 determines that it has accepted the reproduction start position change command. Thereafter, the flow advances to step S205. At step S205, the reproduction control section 15 reads the designated frame as the reproduction start frame from the disc 32 according to the clip table of the index file held in the index file hold section 51. Thereafter, the flow advances to step S206. When the determined result at step S204 represents that the reproduction control section 15 has not accepted the reproduction start position change command, the flow advances to step S206 not through step S205.

At step S206, the reproduction control section 15 determines whether it completes the tape-like reproduction process. When the determined result represents that the reproduction control section 15 does not complete the tape-like reproduction process, the flow advances to step S207. At step S207, the reproduction control section 15 determines whether it has accepted the reproduction start command. When the determined result represents that the reproduction control section 15 has not accepted the reproduction start command, the flow returns to step S204. At step S20, the reproduction control section 15 repeats the process.

In other words, while the reproduction control section 15 is repeating the process from steps S204 to S207, the reproduction control section 15 waits until it has accepted the reproduction start command or completed the tape-like reproduction process. When the determined result at step S207 represents that the reproduction control section 15 has accepted the reproduction start command, the flow advances to step S208. At step S208, the reproduction control section starts the reproduction from the reproduction start frame according to the clip table of the index file held in the index file hold section 51. When the reproduction control section 15 starts the reproduction, the flow advances to step S231 shown in FIG. 26.

When the determined result at step S206 shown in FIG. 25 represents that the reproduction control section 15 completes the tape-like reproduction process according to a user's command or the like, the flow advances to step S209. At step S209, the disc information file management section 63 of the reproduction control section 15 updates the reproduction history of the disc information file. At this point, when the disc insertion process has been performed, if the disc information file has been read from the disc 32 and held in the disc information file hold section 52, the disc information file management section 63 updates the reproduction history of the disc information file held in the disc information file hold section 52. In contrast, when the disc insertion process has been performed, if the disc information file has not been read from the disc 32 and the file exists only on the disc 32, the disc information file management section 63 supplies a reproduction history (disc information file) to be updated to the disc information file record control section 82. The disc information file record control section 82 updates the disc information file recorded on the disc 32 with the supplied reproduction history. Details of the update of the disc information file will be described later with reference to a flow chart shown in FIG. 31 and FIG. 32.

When the disc information file record control section 82 has updated the disc information file, the flow advances to step S210. At step S210, the reproduction control section 15 executes a completion process to complete the tape-like reproduction process.

When the reproduction control section 15 has reproduced the clip at step S208 shown in FIG. 25, the flow advances to step S231 shown in FIG. 26. At step S231, the reproduction control section 15 determines whether it has accepted the reproduction stop command. When the determined result represents that the reproduction control section 15 has not accepted the reproduction stop command and continues the reproduction process, the flow advances to step S232. At step S232, the reproduction control section 15 determines whether it has reproduced the current clip. When the determined result represents that the reproduction control section 15 has not reproduced the current clip, the flow returns to step S231. At step S231, the reproduction control section 15 continues the reproduction process.

When the determined result at step S232 represents that the reproduction control section 15 has reproduced the current clip, the flow advances to step S233. At step S233, the reproduction control section determines whether there is a clip to be reproduced next according to the XML description of the index file as shown in FIG. 7 to FIG. 10. When the XML description of the index file describes that the clip that has been reproduced is not the last clip, but followed by another clip, the flow advances to step S234. At step S234, the reproduction control section 15 references attribute information of a clip directory of the clip to be reproduced next and determines whether the clip can be reproduced.

When the determined result represents that the clip cannot be reproduced because the attribute of the clip directory of the clip to be reproduced is for example "read prohibited," the flow returns to step S233. At step S233, the reproduction control section 15 repeats the process for the next clip.

When the determined result at step S234 represents that the clip can be reproduced because the attribute of the clip directory of the clip to be reproduced is for example "read permitted," the flow advances to step S235. At step S235, the reproduction control section 15 references the clip table of the index file held in the index file hold section 51 and reproduces the designated clip according to information of the clip table. When the reproduction control section has started the reproduction for the clip, the flow returns to step S231. At step S231, the reproduction control section 15 repeats the process.

In other words, while the reproduction control section 15 is repeating the process from step S231 to step S235, the reproduction control section 15 reproduces all clips in the order of which they are described in the index file.

When the determined result at step S233 represents that the reproduction control section 15 has reproduced the last clip in the XML description of the index file and there is no clip to be reproduced next, the flow advances to step S236. At step S236, the reproduction control section 15 stops the reproduction. Thereafter, the flow advances to step S237. At step S237, the reproduction control section 15 reads the top frame of the first clip as the reproduction start frame according to the clip table of the index file held in the index file hold section 51.

Thereafter, the flow returns to step S206. At step S206, the reproduction control section 15 repeats the process.

In other words, when the reproduction control section has fully performed the tape-like reproduction (for the last clip), the reproduction control section stops the reproduction process and designates the top frame of the top clip of the XML description of the index file as the reproduction start frame of the next reproduction process.

When the determined result at step S231 represents that while reproducing the clip, the reproduction control section 15 has accepted the reproduction stop command from the user or the like, the flow advances to step S238. At step S238, the reproduction control section 15 stops the reproduction. Thereafter, the advances to step S239. At step S239, the reproduction control section 15 designates the stop frame as the reproduction start frame of the next reproduction process. After the reproduction control section 15 has designated the reproduction start frame, the flow returns to step S206 shown in FIG. 25. At step S206, the reproduction control section 15 repeats the process.

Thus, the record and reproduction apparatus 1 can record the reproduction history on the disc 32, use the reproduction history in the next tape-like reproduction process, and resume the tape-like reproduction from the last reproduction stop position.

Next, with reference to a flow chart shown in FIG. 27 and FIG. 28, an edit list designation reproduction process executed when an edit list is designated and the designated edit list is reproduced will be described.

Figure 27:
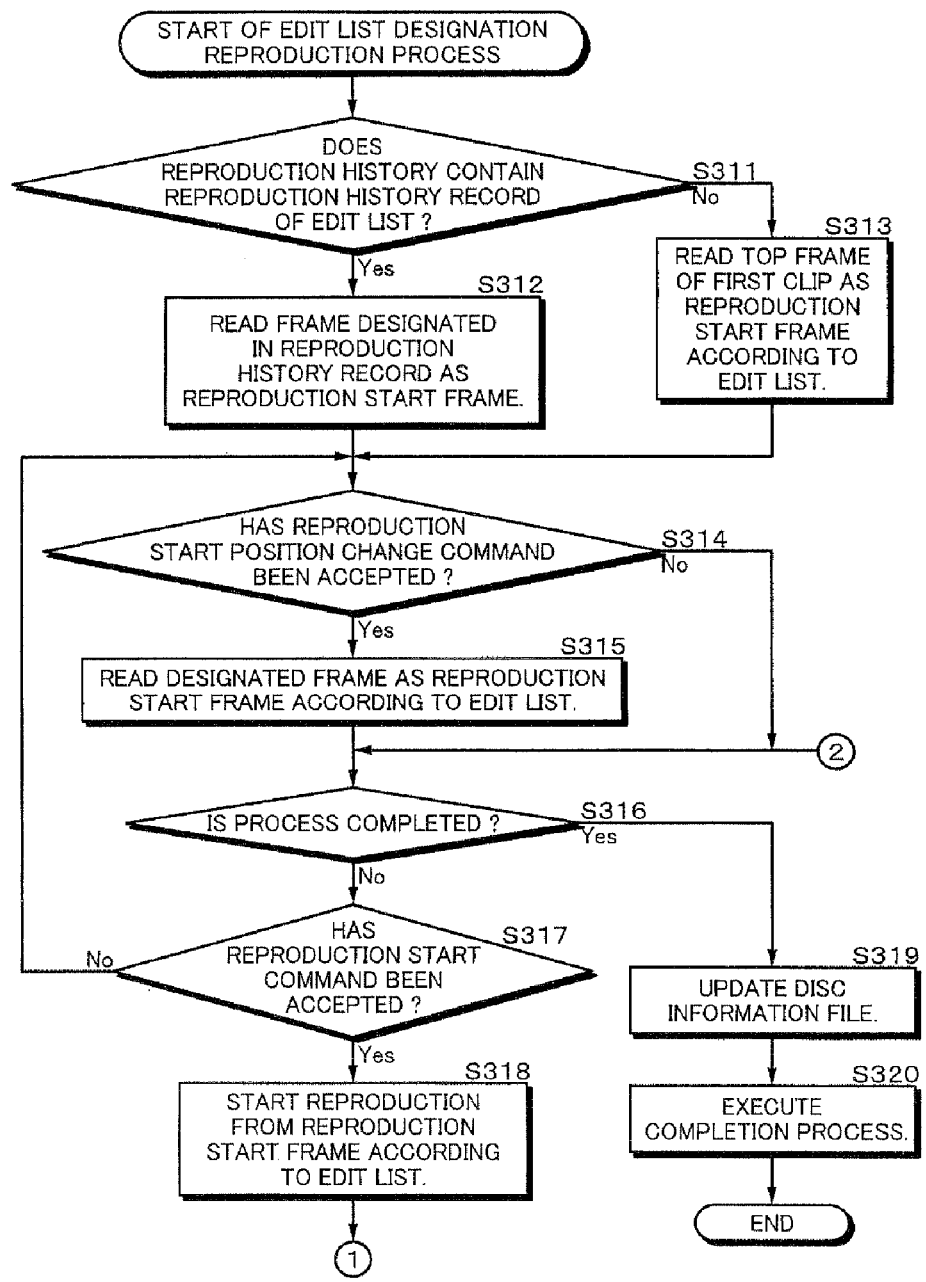
FIG. 27 is a flow chart describing an edit list designation reproduction process.

When the user or the like designates an edit list and issues a command that causes the designated edit list to be reproduced, the flow advances to step S311 shown in FIG. 27. At step S311, the disc information management section 63 of the reproduction control section 15 references the disc information file held in the disc information file hold section 52 of the information hold section 14 and determines whether the reproduction history of the disc information file contains a reproduction history record of the designated edit list.

When the disc has been inserted, if the disc information file has not been read from the disc, the flow advances to step S311. At step S311, the disc information file read section 62 performs a process that reads a reproduction history record of the designated edit list from the disc information file on the disc 32. The disc information management section 63 determines whether the reproduction history contains a reproduction history record of the designated edit list depending on the determined result of whether the disc information file read section 62 has read the reproduction history record of the edit list.

When the determined result at step S311 shown in FIG. 27 represents that reproduction history of the disc information file contains a reproduction history record of the designated edit list, the flow advances to step S312. At step S312, the reproduction control section 15 reads the designated frame in the reproduction history record as a reproduction start frame from the disc 32. Thereafter, the flow advances to step S314.

When the determined result at step S311 represents that the reproduction history does not contain a reproduction history record of the designated edit list, the flow advances to step S313. At step S313, the reproduction control section 15 reads the top frame of the first clip as the reproduction start frame from the disc 32 according to the XML description of the edit list file. Thereafter, the flow advances to step S314.

The first clip is a clip designated as a clip to be reproduced first in the XML description of the edit list file shown in FIG. 22. The top frame is a frame designated as a frame to be reproduced first in the XML description of the edit list file or the clip information file or the like of the clips corresponding to the edit list shown in FIG. 17 and FIG. 18. Thus, the first frame is not always a frame that is reproduced first in material data of a clip. Thus, if the XML description of the edit list file describes that the reproduction for a clip starts from a middle frame, this frame is the first frame.

At step S314, the reproduction control section 15 determines whether it has accepted the reproduction start position change command. When the user has operated the input section 21 and inputted the reproduction start position change command, the reproduction control section 15 determines that it has accepted the reproduction start position change command. Thereafter, the flow advances to step S315. At step S315, the reproduction control section 15 references a clip information file of a clip corresponding to the designated frame according to the XML description of the edit list file and reads the designated frame as a reproduction start frame from the disc 32. Thereafter, the flow advances to step S316. When the determined result at step S314 represents that the reproduction control section 15 has not accepted the reproduction start position change command, the flow advances to step S316 not through step S315.

At step S316, the reproduction control section 15 determines whether it completes the edit list designation reproduction process. When the determined result represents that the reproduction control section 15 does not complete the edit list designation reproduction process, the flow advances to step S317. At step S317, the reproduction control section 15 determines whether it has accepted the reproduction start command. When the determined result represents that the reproduction control section 15 has not accepted the reproduction start command, the flow returns to step S314. At step S314, the reproduction control section 15 repeats the process.

In other words, while the reproduction control section 15 is repeating the process from steps S314 to S317, the reproduction control section 15 waits until it has accepted the reproduction start command or completed the edit list designation reproduction process. When the determined result at step S317 represents that the reproduction control section 15 has accepted the reproduction start command, the flow advances to step S318. At step S318, the reproduction control section 15 references the clip information file according to the XML description of the edit list file and starts the reproduction from the reproduction start frame according to information of the clip information file. When the reproduction control section 15 has started the reproduction, the flow advances to step S341 shown in FIG. 28.

At step S318, the reproduction control section 15 may reference the clip table of the index file according to the XML description of the edit list file. Each clip element of the clip table of the index file describes basically the same information as the clip information file. Thus, with reference to the corresponding clip element of the clip table, the reproduction control section 15 can read the clip and reproduce it.

When the determined result at step S316 shown in FIG. 27 represents that the reproduction control section 15 completes the edit list designation reproduction process according to a user's command or the like, the flow advances to step S319. At step S319, the disc information file management section 63 of the reproduction control section 15 updates the reproduction history of the disc information file. When the disc insertion process has been performed, if the disc information file has been read from the disc 32, the disc information file is held in the disc information file hold section 52. In this case, the disc information file management section 63 updates the reproduction history of the disc information file held in the disc information file hold section 52. When the disc insertion process has been performed, if the disc information file has not been read from the disc 32, the disc information file is present only on the disc 32. In this case, the disc information file management section 63 supplies a reproduction history (disc information file) to be updated to the disc information file record control section 82. The disc information file record control section 82 updates the disc information file recorded on the disc 32 with the supplied reproduction history. Details of the update of the disc information file will be described later with reference to a flow chart shown in FIG. 31 and FIG. 32.

When the disc information file record control section 82 has updated the disc information file, the flow advances to step S320. At step S320, the reproduction control section 15 executes a completion process to complete the edit list designation reproduction process.

Figure 28:
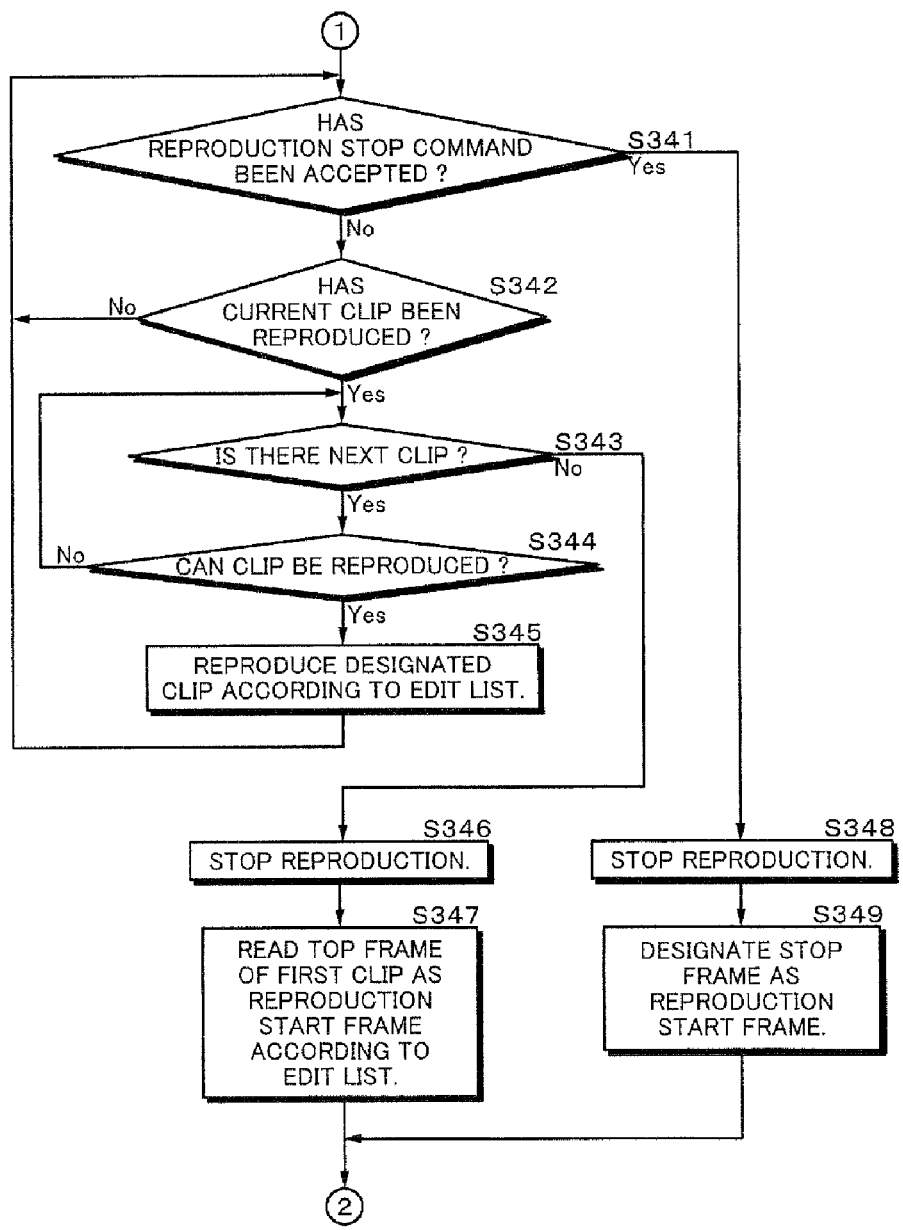
FIG. 28 is a flowchart describing the edit list designation process, as a part preceded by FIG. 27.

When the reproduction control section 15 has started the reproduction for the clip at step S318 shown in FIG. 27, the flow advances to step S341 shown in FIG. 28. At step S341, the reproduction control section 15 determines whether it has accepted the reproduction stop command. When the determined result represents that the reproduction control section 15 has not accepted the command and continues the reproduction process, the flow advances to step S342. At step S342, the reproduction control section 15 determines whether it has reproduced the current clip. When the determined result represents that the reproduction control section 15 has not reproduced the current clip, the flow returns to step S341. At step S341, the reproduction control section 15 continues the process.

When the determined result at step S342 represents that the reproduction control section 15 has reproduced the current clip, the flow advances to step S343. At step S343, the reproduction control section 15 determines whether there is a clip to be reproduced next according to the XML description of the edit list file. When the determined result represents that there is a clip to be reproduced next because the clip that the reproduction control section 15 has reproduced is not the last clip in the XML description of the edit list file, the flow advances to step S344. At step S344, the reproduction control section 15 references attribute information of a clip directory of the clip and determines whether the reproduction control section 15 can reproduce the clip.

When the determined result represents that the reproduction control section 15 cannot reproduce the clip because the attribute of the clip directory of the clip to be reproduced is for example "read prohibited," the reproduction control section 15 does not reproduce the clip. Thereafter, the flow returns to step S343. At step S343, the reproduction control section 15 repeats the process for the next clip.

When the determined result at step S344 represents that the reproduction control section 15 can reproduce the clip because the attribute of the clip directory of the clip to be reproduced is for example "read permitted," the flow advances to step S345. At step S345, the reproduction control section 15 references a clip information file of the designated clip according to the XML description of the edit list file and reproduces the clip according to the information of the clip information file. When the reproduction control section 15 has started the reproduction for the clip, the flow returns to step S341. At step S341, the reproduction control section 15 repeats the process.

In other words, while the reproduction control section 15 is repeating the process from step S341 to step S345, the reproduction control section 15 reproduces clips in the order of which they are described in the edit list file.

At step S345, the reproduction control section 15 may reference the clip table of the index file according to the XML description of the edit list file. Each clip element of the clip table of the index file describes basically the same information as the clip information file. Thus, with reference to the clip elements of the clip table, the reproduction control section 15 can read the clip and reproduce it.

When the reproduction control section 15 has completed the reproduction for the last clip in the XML description of the edit list file and determines that there is no clip to be reproduced next, the flow advances to step S346. At step S346, the reproduction control section 15 stop the reproduction. Thereafter, the flow advances to step S347. At step S347, the reproduction control section 15 references the clip information file or the clip table of the index file according to the XML description of the edit list file and reads the top frame of the first clip as a reproduction start frame according to information of the clip information file or the clip table. Thereafter, the flow returns to step S316 shown in FIG. 27. At step S316, the reproduction control section 15 repeats the process.

In other words, when the reproduction control section 15 has reproduced the last frame in the edit list designation reproduction, the reproduction control section stops the reproduction process and designates the first frame of the first clip in the XML description of the edit list file as the reproduction start frame of the next reproduction process.

When the determined result at step S341 shown in FIG. 28 represents that the reproduction control section 15 has accepted the reproduction stop command from the user or the like while reproducing the clip, the flow advances to step S348. At step S348, the reproduction control section 15 stops the reproduction. At step S349, the reproduction control section 15 designates the stop frame as the reproduction start frame of the next reproduction process. After the reproduction control section 15 has designated the reproduction start frame, the flow returns to step S316 shown in FIG. 27. At step S316, the reproduction control section 15 repeats the process.

Thus, when the record and reproduction apparatus 1 performs the edit list designation reproduction, the record and reproduction apparatus 1 can record a reproduction history on the disc 32. The record and reproduction apparatus 1 can use the reproduction history in the next edit list designation reproduction process and resume the edit list designation reproduction from the last reproduction stop position.

Next, with reference to a flow chart shown in FIG. 29 and FIG. 30, a clip designation reproduction process executed when a clip is designated and the designated clip is reproduced will be described.

Figure 29:
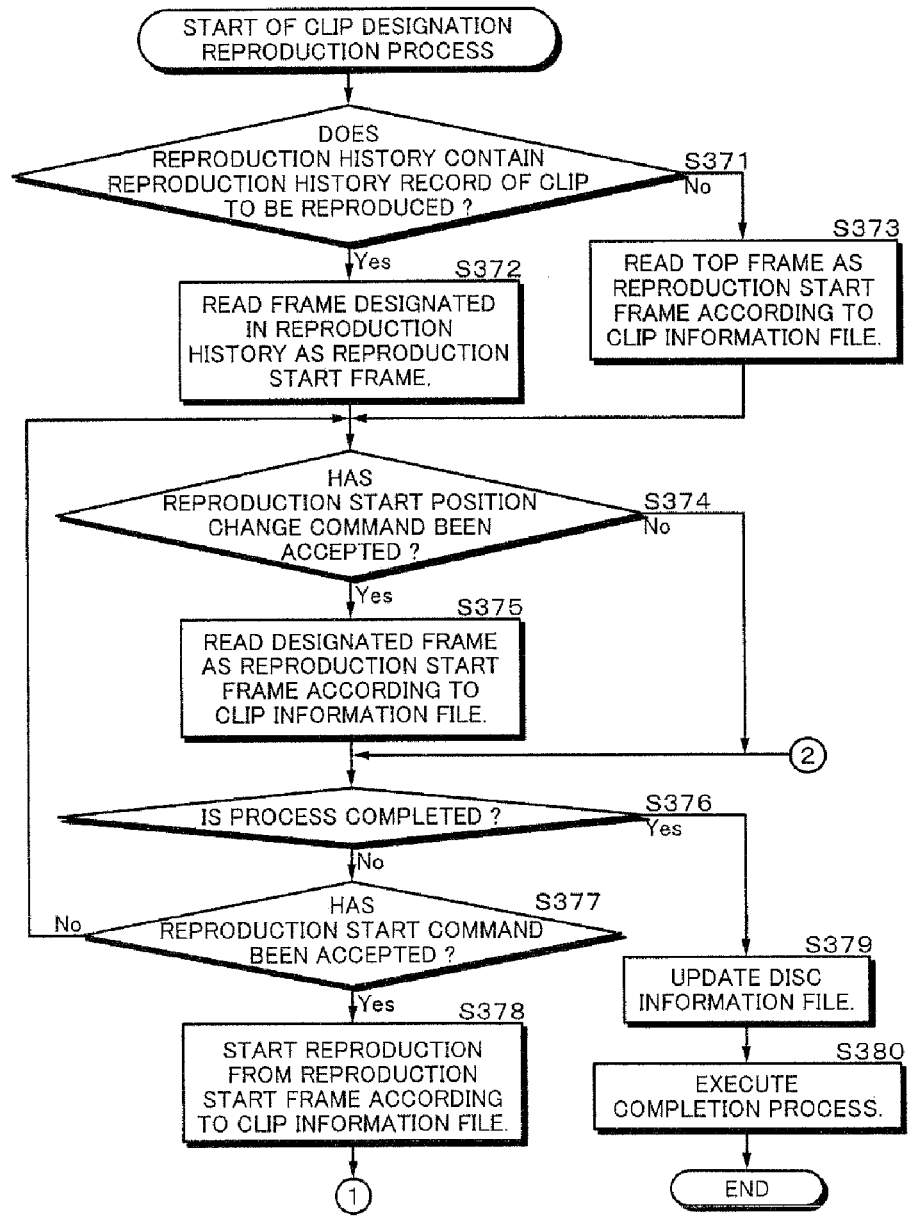
FIG. 29 is a flow chart describing a clip designation reproduction process.

When the user or the like designates a clip and issues a command that causes the designated clip to be reproduced, the flow advances to step S371 shown in FIG. 29. At step S371, the disc information management section 63 of the reproduction control section 15 references the disc information file held in the disc information file hold section 52 of the information hold section 14 and determines whether the reproduction history of the disc information file contains a reproduction history record of the clip designation reproduction of the designated clip.

When the disc has been inserted, if the disc information file has not been read from the disc, the flow advances to step S371. At step S371, the disc information file read section 62 performs a process that reads a reproduction history record of the designated clip from the disc information file on the disc 32. The disc information management section 63 determines whether the reproduction history contains a reproduction history record of the clip designation reproduction of the designated clip depending on the determined result of whether the disc information file read section 62 has read the reproduction history record of the clip designation reproduction of the clip.

When the determined result at step S371 shown in FIG. 29 represents that reproduction history of the disc information file contains a reproduction history record of the clip designation reproduction of the designated clip, the flow advances to step S372. At step S372, the reproduction control section 15 reads the designated frame in the reproduction history record as a reproduction start frame from the disc 32. Thereafter, the flow advances to step S374.

When the determined result at step S371 represents that the reproduction history does not contain a reproduction history record of the clip designation reproduction of the designated clip, the flow advances to step S373. At step S373, the reproduction control section 15 reads the top frame as the reproduction start frame from the disc 32 according to the XML description of the clip information file. Thereafter, the flow advances to step S374.

The first clip is a frame to be reproduced first in the XML description of the clip information file shown in FIG. 17 and FIG. 18. Thus, the first frame is not always a frame that is reproduced first in material data of a clip. Thus, if the XML description of the clip information file describes that the reproduction for a clip starts from a middle frame, this frame is the first frame.

At step S374, the reproduction control section 15 determines whether it has accepted the reproduction start position change command. When the user has operated the input section 21 and inputted the reproduction start position change command, the reproduction control section 15 determines that it has accepted the reproduction start position change command. Thereafter, the flow advances to step S375. At step S375, the reproduction control section 15 reads the designated frame as a reproduction start frame from the disc 32 according to the XML description of the clip information file. Thereafter, the flow advances to step S376. When the determined result at step S374 represents that the reproduction control section 15 has not accepted the reproduction start position change command, the flow advances to step S376 not through step S375.

At step S376, the reproduction control section 15 determines whether it completes the clip designation reproduction process. When the determined result represents that the reproduction control section 15 does not complete the clip designation reproduction process, the flow advances to step S377. At step S377, the reproduction control section 15 determines whether it has accepted the reproduction start command. When the determined result represents that the reproduction control section 15 has not accepted the reproduction start command, the flow returns to step S374. At step S374, the reproduction control section 15 repeats the process.

In other words, while the reproduction control section 15 is repeating the process from steps S374 to S377, the reproduction control section 15 waits until it has accepted the reproduction start command or completed the clip designation reproduction process. When the determined result at step S377 represents that the reproduction control section 15 has accepted the reproduction start command, the flow advances to step S378. At step S378, the reproduction control section 15 starts the reproduction from the reproduction start frame according to the XML description of the clip information file. When the reproduction control section 15 has started the reproduction, the flow advances to step S401 shown in FIG. 30.

At step S378, the reproduction control section 15 may reference the clip table of the index file. Each clip element of the clip table of the index file describes basically the same information as the clip information file. Thus, with reference to the corresponding clip element of the clip table, the reproduction control section 15 can read the clip and reproduce it.

When the determined result at step S376 shown in FIG. 29 represents that the reproduction control section 15 completes the clip designation reproduction process according to a user's command or the like, the flow advances to step S379. At step S379, the disc information file management section 63 of the reproduction control section 15 updates the reproduction history of the disc information file. When the disc insertion process has been performed, if the disc information file has been read from the disc 32, the disc information file is held in the disc information file hold section 52. In this case, the disc information file management section 63 updates the reproduction history of the disc information file held in the disc information file hold section 52. When the disc insertion process has been performed, if the disc information file has not been read from the disc 32, the disc information file is present only on the disc 32. In this case, the disc information file management section 63 supplies a reproduction history (disc information file) to be updated to the disc information file record control section 82. The disc information file record control section 82 updates the disc information file recorded on the disc 32 with the supplied reproduction history. Details of the update of the disc information file will be described later with reference to a flow chart shown in FIG. 31 and FIG. 32.

When the disc information file record control section 82 has updated the disc information file, the flow advances to step S380. At step S380, the reproduction control section 15 executes a completion process to complete the clip designation reproduction process.

Figure 30:
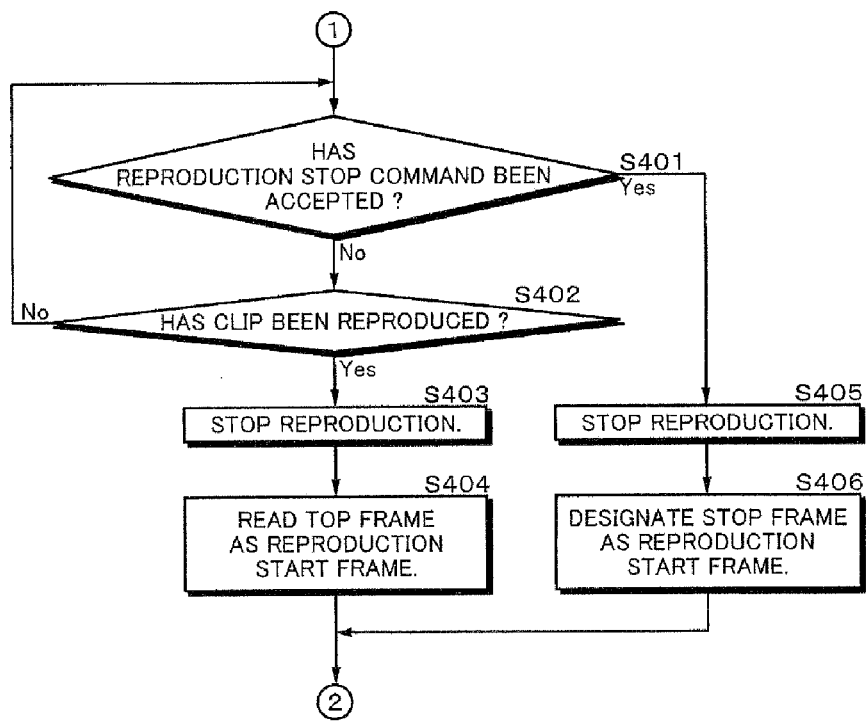
FIG. 30 is a flow chart describing the clip designation reproduction process, as a part preceded by FIG. 29.

When the reproduction control section 15 has started the reproduction for the clip at step S378 shown in FIG. 29, the flow advances to step S401 shown in FIG. 30. At step S401, the reproduction control section 15 determines whether it has accepted the reproduction stop command. When the determined result represents that the reproduction control section 15 has not accepted the command and continues the reproduction process, the flow advances to step S402. At step S402, the reproduction control section 15 determines whether it has reproduced the clip. When the determined result represents that the reproduction control section 15 has not reproduced the clip, the flow returns to step S401. At step S401, the reproduction control section 15 continues the process.

When the determined result at step S402 represents that the reproduction control section 15 has reproduced the clip, the flow advances to step S403. At step S403, the reproduction control section 15 stops the reproduction. At step S404, the reproduction control section 15 reads the top frame as the reproduction start frame according to the XML description of the clip information file. Thereafter, the flow returns to step S376 shown in FIG. 29. At step S376, the reproduction control section 15 repeats the process.

In other words, when the reproduction control section 15 has reproduced the last frame in the clip designation reproduction, the reproduction control section stops the reproduction process and designates the first frame in the XML description of the clip information file as the reproduction start frame of the next reproduction process.

When the determined result at step S401 shown in FIG. 30 represents that the reproduction control section 15 has accepted the reproduction stop command from the user or the like while reproducing the clip, the flow advances to step S405. At step S405, the reproduction control section 15 stops the reproduction. At step S406, the reproduction control section 15 designates the stop frame as the reproduction start frame of the next reproduction process. After the reproduction control section 15 has designated the reproduction start frame, the flow returns to step S376 shown in FIG. 29. At step S376, the reproduction control section 15 repeats the process.

Thus, when the record and reproduction apparatus 1 performs the clip designation reproduction, the record and reproduction apparatus 1 can record a reproduction history on the disc 32. The record and reproduction apparatus 1 can use the reproduction history in the next clip designation reproduction process and resume the clip designation reproduction from the last reproduction stop position.

When the reproduction control section 15 has completed the reproduction process, each section of the record and reproduction apparatus 1 executes a disc information file update process that updates the reproduction history of the disc information file recorded on the disc 32. Next, with reference to FIG. 31 and FIG. 32, the disc information file update process will be described.

When the disc information file update process has been started, the flow advances to step S421 shown in FIG. 31. At step S421, the disc information file management section 63 determines whether the type of the reproduction that the reproduction control section 15 has stopped is the tape-like reproduction.

When the disc has been inserted, if the disc information file has not been read, before step S421, the disc information file read section 62 reads the disc information file from the disc 32 and causes the disc information file hold section 52 to hold the disc information file.

When the determined result at step S421 represents that the type of the reproduction that the reproduction control section 15 has stopped is the tape-like reproduction, the flow advances to step S422. At step S422, the disc information file management section 63 generates a history record of this tape-like reproduction. Thereafter, the flow advances to step S423. At step S423, the disc information file management section 63 references a reproduction history (current reproduction history) of the disc information file held in the disc information file hold section 52 and determines whether the current reproduction history contains a history record of the tape-like reproduction.

When the determined result at step S423 represents that the current reproduction history contains a history record of the tape-like reproduction, the flow advances to step S424. At step S424, the disc information file management section 63 deletes an old history record of the tape-like reproduction from the reproduction history of the disc information file held in the disc information file hold section 52 and registers the newly generated history record of the tape-like reproduction at the newest position of the reproduction history. In the case shown in FIG. 11, the disc information file management section 63 deletes the history record of line 6 of the tape-like reproduction, moves the history record of line 5 to the position of line 6, moves the history record of line 4 to the position of line 5, and inserts the newly generated history record of the tape-like reproduction in the position of the top line (line 4, the position of the newest history record of the reproduction history) of the reproduction history.

After the disc information file management section 63 has completed the process at step S424, the flow advances to step S426.

When the determined result at step S423 represents that the current reproduction history does not contain a history record of the tape-like reproduction, the flow advances to step S425. At step S425, the disc information file management section 63 deletes the oldest history record of the reproduction history of the disc information file held in the disc information file hold section 52. Thereafter, the flow advances to step S422. At step S422, the disc information file management section 63 registers the newly generated history record of the tape-like reproduction at the newest record position of the reproduction history. For example, if line 6 of the XML description shown in FIG. 11 is not a history record of the tape-like reproduction, the disc information file management section 63 deletes the history record of line 9 shown in FIG. 11, moves the history records of line 4 to line 8 to the positions of line 5 to line 9, respectively, and inserts the newly generated history record of the tape-like reproduction in the position of the top line (line 4, the newest history record position of the reproduction history) of the reproduction history.

After the disc information file management section 63 has completed the process at step S425, the flow advances to step S426.

When the determined result at step S421 represents that the type of the reproduction that the reproduction control section 15 has stopped is not the tape-like reproduction, the flow advances to step S426.

At step S426, the disc information file management section 63 determines whether the type of the reproduction that the reproduction control section 15 has stopped is the edit list designation reproduction.

When the determined result at step S426 represents that the type of the reproduction that the reproduction control section 15 has stopped is the edit list designation reproduction, the flow advances to step S427. At step S427, the disc information file management section 63 generates a history record of this edit list designation reproduction. Thereafter, the flow advances to step S428. At step S428, the disc information file management section 63 references a reproduction history (current reproduction history) of the disc information file held in the disc information file hold section 52 and determines whether the current reproduction history contains a history record of the edit list designation reproduction for the same edit list as the newly generated history record of the edit list designation reproduction.

When the determined result at step S428 represents that the current reproduction history contains a history record of the edit list designation reproduction for the same edit list as the newly generated history record of the edit list designation reproduction, the flow advances to step S429. At step S429, the disc information file management section 63 deletes an old history record of the edit list designation reproduction from the reproduction history of the disc information file held in the disc information file hold section 52 and registers the new history record generated at step S427 of the edit list designation reproduction at the newest position of the reproduction history. When the disc information file management section 63 generates a history record of the reproduction of edit list [E0004] shown in FIG. 11, the disc information file management section 63 deletes the history record of line 7 of the edit list designation reproduction, moves the history record of line 6 to the position of line 5, moves the history record of line 5 to the position of line 6, move the history record of line 4 to the position of line 4, and inserts the newly generated history record of the edit list designation reproduction of edit list [E0004] in the position of the top line (line 4, the position of the newest history record) of the reproduction history.

After the disc information file management section 63 has completed the process at step S429, the flow advances to step S451 shown in FIG. 32.

When the determined result at step S428 represents that the current reproduction history does not contain a history record of the edit list designation reproduction for the same edit list as the newly generated history record of the edit list designation reproduction. the flow advances to step S430. At step S430, the disc information file management section 63 deletes the oldest history record of the reproduction history of the disc information file held in the disc information file hold section 52. Thereafter, the flow advances to step S427. At step S427, the disc information file management section 63 registers the newly generated history record of the edit list designation reproduction at the newest record position of the reproduction history. For example, in the case shown in FIG. 11, if the disc information file management section 63 generates a history record of the reproduction of edit list [E0003], since the reproduction history shown in FIG. 11 does not contain a history record of the edit list designation reproduction of edit list [E0003], the disc information file management section 63 deletes the history record of line 9, moves the history records of line 4 to line 8 to the positions of line 5 to line 9, respectively, and inserts the newly generated history record of the edit list designation reproduction of edit list [E0003] in the position of the top line (line 4, the newest history record position of the reproduction history) of the reproduction history.

After the disc information file management section 63 has completed the process at step S430, the flow advances to step S451 shown in FIG. 32.

When the determined result at step S426 represents that the type of the reproduction that the reproduction control section 15 has stopped is not the edit list designation reproduction, the flow advances to step S451 shown in FIG. 32.

At step S451 shown in FIG. 32, the disc information file management section 63 determines whether the type of the reproduction that the reproduction control section 15 has stopped is the clip designation reproduction.

When the determined result at step S451 represents that the type of the reproduction that the reproduction control section 15 has stopped is the clip designation reproduction, the flow advances to step S452. At step S452, the disc information file management section 63 generates a history record of this clip designation reproduction. Thereafter, the flow advances to step S453. At step S453, the disc information file management section 63 references a reproduction history (current reproduction history) of the disc information file held in the disc information file hold section 52 and determines whether the current reproduction history contains a history record of the clip designation reproduction for the same clip as the newly generated history record of the clip designation reproduction.

When the determined result at step S453 represents that the current reproduction history contains a history record of the clip designation reproduction for the same clip as the newly generated history record of the clip designation reproduction, the flow advances to step S454. At step S454, the disc information file management section 63 deletes an old history record of the clip designation reproduction from the reproduction history of the disc information file held in the disc information file hold section 52 and registers the new history record generated at step S457 of the clip designation reproduction at the newest position of the reproduction history. When the disc information file management section 63 generates a history record of the clip designation reproduction for clip [C0003] shown in FIG. 11, the disc information file management section 63 deletes the history record of line 4 of the clip designation reproduction and inserts the newly generated history record of the clip designation reproduction for clip [C0003] in the position of the top line (line 4, the position of the newest history record) of the reproduction history.

Although the history record of the disc information file shown in FIG. 11 contains a history record of [C0003], line 6, FIG. 11, since this history record is for the take-like reproduction, not the clip designation reproduction. Thus, at step S454, the disc information file management section 63 does not update the reproduction history.

After the disc information file management section 63 has completed the process at step S454, the flow advances to step S456.

When the determined result at step S453 represents that the current reproduction history does not contain a history record of the clip designation reproduction for the same clip as the newly generated history record of the clip designation reproduction, the flow advances to step S455. At step S455, the disc information file management section 63 deletes the oldest history record of the reproduction history of the disc information file held in the disc information file hold section 52. Thereafter, the flow advances to step S452. At step S452, the disc information file management section 63 registers the newly generated history record of the clip designation reproduction at the newest record position of the reproduction history. For example, in the case shown in FIG. 11, if the disc information file management section 63 generates a history record of the clip designation reproduction for clip [C0001], since the reproduction history shown in FIG. 11 does not contain a history record of the clip designation reproduction for clip [C0001], the disc information file management section 63 deletes the history record of line 9, moves the history records of line 4 to line 8 to the positions of line 5 to line 9, respectively, and inserts the newly generated history record of the clip designation reproduction for clip [C0001] in the position of the top line (line 4, the newest history record position of the reproduction history) of the reproduction history.

After the disc information file management section 63 has completed the process at step S455, the flow advances to step S456 shown in FIG. 32.

When the determined result at step S451 represents that the type of the reproduction that the reproduction control section 15 has stopped is not the clip designation reproduction, the flow advances to step S456.

At step S456, the disc information file record control section 82 records the updated disc information file held in the disc information file hold section 52 on the disc 32 so that the updated disc information file is overwritten on the disc information file recorded on the disc 32.

After the disc information file record control section 82 has completed the process at step S456, the disc information file record control section 82 completes the disc information file update process.

When the disc information file update process is executed in the foregoing manner, the record and reproduction apparatus 1 can record a reproduction history of various types of reproduction methods for material data on the disc 32, use the reproduction history in the next reproduction process, and resume the reproduction from the last reproduction stop position (frame).

In addition, since a reproduction history is recorded as one file different from other information on the disc 32, when the record and reproduction apparatus 1 updates the reproduction history, the record and reproduction apparatus 1 does not need to update other unnecessary information. Thus, when the record and reproduction apparatus 1 updates the reproduction history, other information can be prevented from being mistakenly destroyed. In addition, the data amount for which the record and reproduction apparatus 1 updates a reproduction history can be decreased. Thus, the load of the update process can be lightened and the process time for the update process can be shortened. As a result, the production cost of the record and reproduction apparatus 1 can be decreased.

In the foregoing, the case of which material data are reproduced by the record and reproduction apparatus shown in FIG. 1 was described. Instead, the present invention may be applied to for example an edit apparatus that edits material data or a reproduction apparatus that performs a reproduction process for material data. The edit apparatus according to the present invention needs to contain the structure of the record and reproduction apparatus 1 shown in FIG. 1. Since the process that the edit apparatus performs to reproduce material data is the same as that of the record and reproduction apparatus 1, the description will be omitted.

Figure 33:
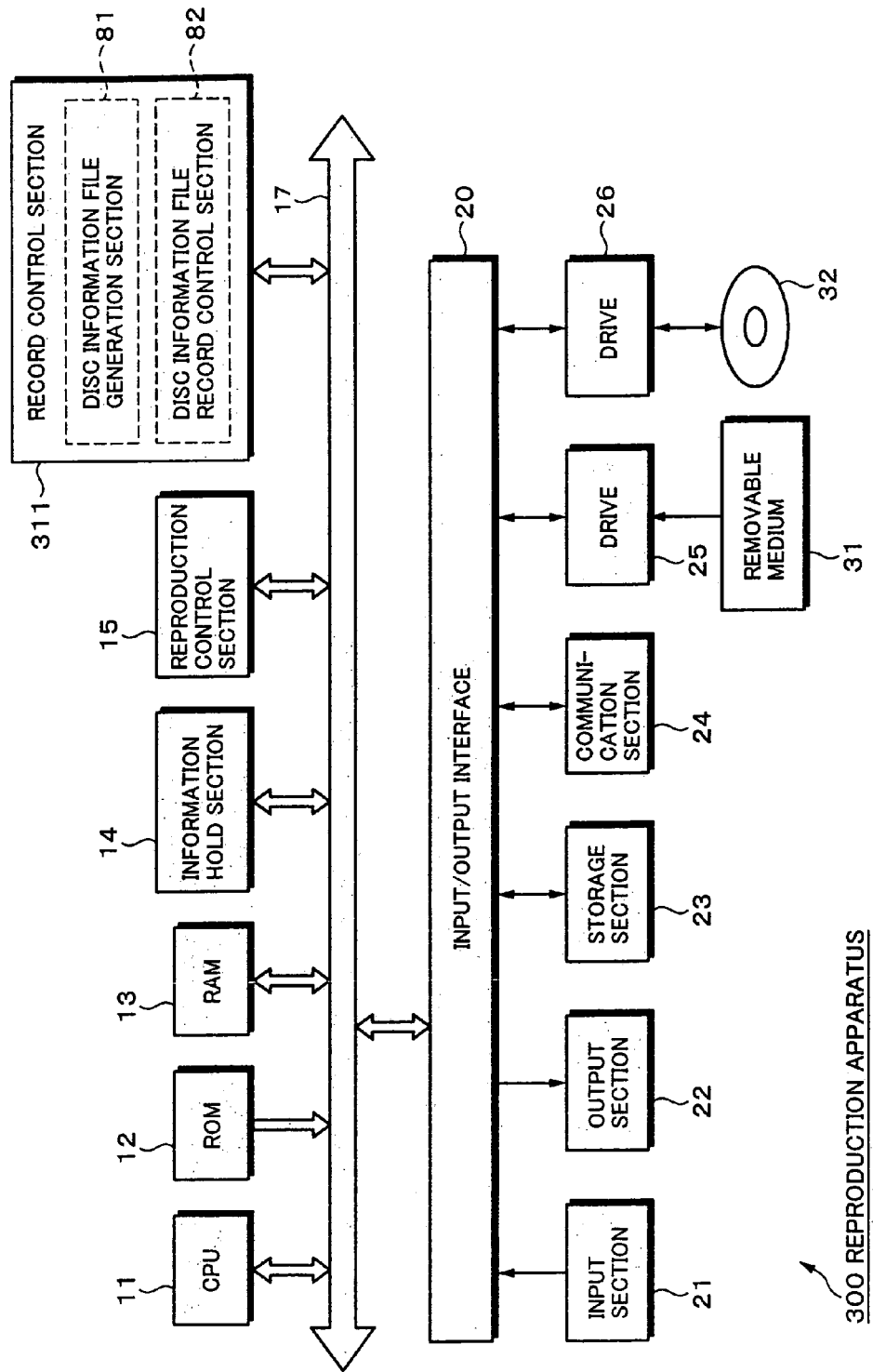
FIG. 33 is a block diagram showing an example of the structure of a reproduction apparatus according to the present invention.

FIG. 33 is a block diagram showing an example of the structure of the reproduction apparatus according to the present invention. In FIG. 33, similar sections to those in FIG. 1 are denoted by similar reference numerals and their description will be omitted.

A reproduction apparatus 300 is a reproduction apparatus that reproduces material data recorded on the foregoing disc 32. The reproduction apparatus 300 has a record control section 311 that records a disc information file on the disc 32. Like the case of the foregoing record and reproduction apparatus 1, the reproduction apparatus 300 can use the disc information file and reproduce the material data from the last reproduction stop position.

Like the record control section 16 of the record and reproduction apparatus 1 shown in FIG. 4, the record control section 311 has a disc information file generation section 81 and a disc information file record control section 82. With them, the record control section 311 can generate the disc information file and record a newly generated reproduction history to the disc 32 loaded into the drive 26.

The reproduction apparatus 300 omits a material data record function from the record and reproduction apparatus 1 shown in FIG. 1. The reproduction apparatus 300 performs a reproduction process for material data recorded on the disc 32 in the same manner as the record and reproduction apparatus 1 does. In other words, the reproduction apparatus 300 reproduces material data recorded on the disc 32 according to a method such as the tape-like reproduction, the edit list designation reproduction, or the clip designation reproduction and records the reproduction history on the disc 32. When the reproduction apparatus 300 starts the reproduction, the reproduction apparatus 300 can reference a reproduction history recorded on the disc 32 and reproduce material data from the last reproduction stop position.

In addition, since the reproduction apparatus 300 records a reproduction history as one file different from other information, when the reproduction apparatus 300 updates the reproduction history, the reproduction apparatus 300 does not need to update other unnecessary information. Thus, when the reproduction apparatus 300 updates a reproduction history, other unnecessary information can be prevented from being mistakenly destroyed. In addition, the data amount for which the reproduction apparatus 300 updates the reproduction history can be decreased. In addition, the load of the update process can be lightened and the process time for the update process can be shortened. Thus, the production cost of the reproduction apparatus 300 can be decreased.

In the foregoing, the reproduction stop position as a reproduction history in the disc information file is stored in the unit of a frame. Instead, the reproduction stop position may be stored in any unit. For example, the reproduction stop position may be in the unit of a GOP (Group of Picture). Instead, the reproduction stop position may be stored with a time code different from a frame.

In the foregoing, the reproduction stop position as the reproduction history of the disc information file is stored as the number of frames starting from the first frame (or top frame). Instead, the reproduction stop position may be based on any position.

As described above, the record and reproduction apparatus, the edit apparatus, or the reproduction apparatus according to the present invention records a reproduction history of material data as a file different from other information on the disc 32. When the apparatus starts reproducing the material data, the apparatus performs a process that decides a reproduction start position with the reproduction history recorded on the disc 32. These processes may be performed in any method. In addition, another process may be performed along with these processes. As long as the record and reproduction apparatus, the edit apparatus, or the reproduction apparatus according to the present invention can execute these processes, the structure of the apparatus is not limited to the foregoing structure.

The foregoing sequence of processes can be executed by hardware or software. When these processes are executed by software, the foregoing video process apparatus is composed by a personal computer as shown in FIG. 34. In FIG. 34, similar sections to those in FIG. 1 are denoted by similar reference numerals and their description will be omitted.

In FIG. 34, a CPU 401 of a personal computer 400 executes various processes according to a program stored in a ROM 402 or a program loaded from a storage section 413 to a RAM 403. When necessary, the RAM 403 also stores data and so forth that the CPU 401 needs when it executes various processes.

The CPU 401, the ROM 402, and the RAM 403 are mutually connected through a bus 404. Connected to the bus 404 is also an input/output interface 410.

Connected to the input/output interface 410 are an input section 411 composed of a keyboard, a mouse, and so forth, an output section 412 composed of a display device such as a CRT (Cathode Ray Tube) or an LCD (Liquid Crystal Display), a speaker, and so forth, a storage section 413 composed of a hard disk or the like, and a communication section 414 composed of a modem and so forth. The communication section 414 performs a communication process through a network including the Internet.

When necessary, a drive 415 is connected to the input/output interface 410. When necessary, a removable medium 421 such as a magnetic disc, an optical disc, an optical-magnetic disc, or a semiconductor memory is loaded into (attached to) the drive 415. When necessary, a computer program read from the removable medium 421 is installed to the storage section 413.

When the sequence of processes are executed by software, a program that composes the software is installed from a network or a record medium.

As shown in FIG. 1, FIG. 33, or FIG. 34, the record medium may be unaccompanied by the main body of the apparatus and delivered to the user to provide the program. In this case, the record medium on which the program has been recorded may be a magnetic disc (including a floppy disc), an optical disc (including CD-ROM (Compact Disc-Read Only Memory) and DVD (Digital Versatile Disc)), an optical-magnetic disc (including MD (Mini-Disc)), the removable medium 31 or the removable medium 421 composed of a semiconductor memory or the like. Instead, the record medium may be pre-installed to the main body of the apparatus. In this case, the record medium on which the program has been recorded may be the ROM 12, the ROM 402, or a hard disk included in the storage section 23 or the storage section 413.

In this specification, steps that describe a program provided by a medium are executed sequentially in the order of which they are described. Instead, the steps may be executed in parallel or discretely.

In this specification, the system represents a whole apparatus composed of a plurality of devices.

As described above, according to the present invention, video data, audio data, and so forth recorded on a record medium can be reproduced. In particular, according to the present invention, convenience of a record medium can be improved. For example, according to the present invention, a reproduction process can be more easily performed than before.

DESCRIPTION OF REFERENCE NUMERALS

1 RECORD AND REPRODUCTION APPARATUS
14 INFORMATION HOLD SECTION
15 REPRODUCTION CONTROL SECTION
16 RECORD CONTROL SECTION
32 DISC
51 INDEX FILE HOLD SECTION
52 DISC INFORMATION FILE HOLD SECTION
61 INDEX FILE READ SECTION
62 DISC INFORMATION FILE READ SECTION
63 DISC INFORMATION FILE MANAGEMENT SECTION
71 INDEX FILE GENERATION SECTION
72 INDEX FILE MANAGEMENT SECTION
73 INDEX FILE RECORD CONTROL SECTION
81 DISC INFORMATION FILE GENERATION SECTION
82 DISC INFORMATION FILE RECORD CONTROL SECTION
204 INDEX FILE
206 DISC INFORMATION FILE
300 REPRODUCTION APPARATUS
311 RECORD CONTROL SECTION
S11 PERFORM UDF FORMAT PROCESS.
S12 GENERATE PROAV ROOT DIRECTORY.
S13 GENERATE CLIP ROOT DIRECTORY.
S14 GENERATE EDIT ROOT DIRECTORY.
S15 GENERATE INDEX FILE.
S16 GENERATE DISC INFORMATION FILE.
S31 READ INDEX FILE.
S32 READ DISC INFORMATION FILE.
S51 GENERATE CLIP DIRECTORY.
S52 GENERATE CLIP INFORMATION FILE.
S53 GENERATE EACH FILE FOR EACH TYPE DATA THAT COMPOSE CLIP.
S54 ADD CLIP ELEMENT TO CLIP TABLE.
S55 RECORD INDEX FILE.
S71 REFERENCE ATTRIBUTE INFORMATION OF DIRECTORY.
S72 CAN CLIP BE UPDATED ?
S73 UPDATE EACH FILE OF CLIP.
S74 UPDATE CLIP INFORMATION FILE.
S75 UPDATE CLIP TABLE.
S76 RECORD INDEX FILE.
S77 PERFORM ERROR PROCESS.
S91 REFERENCE ATTRIBUTE INFORMATION OF DIRECTORY.
S92 CAN CLIP BE DELETED ?
S93 DELETE CLIP DIRECTORY.
S94 DELETE CLIP ELEMENT FROM CLIP TABLE.

S95 RECORD INDEX FILE.
S96 PERFORM ERROR PROCESS.
S111 GENERATE EDIT DIRECTORY.
S112 GENERATE EDIT LIST FILE.
S113 GENERATE EACH FILE THAT COMPOSES EDIT LIST.
S114 ADD EDIT LIST ELEMENT TO EDIT LIST TABLE.
S115 RECORD INDEX FILE.
S131 REFERENCE ATTRIBUTE INFORMATION OF DIRECTORY.
S132 CAN EDIT LIST BE UPDATED ?
S133 UPDATE EACH FILE OF EDIT LIST.
S134 UPDATE EDIT LIST FILE.
S135 UPDATE EDIT LIST TABLE.
S136 RECORD INDEX FILE.
S137 PERFORM ERROR PROCESS.
S151 REFERENCE ATTRIBUTE INFORMATION OF DIRECTORY.
S152 CAN EDIT LIST BE DELETED ?
S153 DELETE EDIT LIST DIRECTORY.
S154 DELETE EDIT LIST ELEMENT FROM EDIT LIST TABLE.
S155 RECORD INDEX FILE.
S156 PERFORM ERROR PROCESS.
S201 DOES REPRODUCTION HISTORY CONTAIN HISTORY RECORD OF TAPE-LIKE REPRODUCTION ?
S202 READ FRAME DESIGNATED IN REPRODUCTION HISTORY AS REPRODUCTION START FRAME.
S203 READ TOP FRAME OF FIRST CLIP AS REPRODUCTION START FRAME ACCORDING TO CLIP TABLE.
S204 HAS REPRODUCTION START POSITION CHANGE COMMAND BEEN ACCEPTED ?
S205 READ DESIGNATED FRAME AS REPRODUCTION START FRAME ACCORDING TO CLIP TABLE.
S206 IS PROCESS COMPLETED ?
S207 HAS REPRODUCTION START COMMAND BEEN ACCEPTED ?
S208 START REPRODUCTION FROM REPRODUCTION START FRAME ACCORDING TO CLIP TABLE.
S209 UPDATE DISC INFORMATION FILE.
S210 EXECUTE COMPLETION PROCESS.
S231 HAS REPRODUCTION STOP COMMAND BEEN ACCEPTED ?
S232 HAS CURRENT CLIP BEEN REPRODUCED ?
S233 IS THERE NEXT CLIP ?
S234 CAN CLIP BE REPRODUCED ?
S235 REPRODUCE DESIGNATED CLIP ACCORDING TO CLIP TABLE.
S236 STOP REPRODUCTION.
S237 READ TOP FRAME OF FIRST-CLIP AS REPRODUCTION START FRAME ACCORDING TO CLIP TABLE.
S238 STOP REPRODUCTION.
S239 DESIGNATE STOP FRAME AS REPRODUCTION START FRAME.
S311 DOES REPRODUCTION HISTORY CONTAIN REPRODUCTION HISTORY RECORD OF EDIT LIST ?
S312 READ FRAME DESIGNATED IN REPRODUCTION HISTORY RECORD AS REPRODUCTION START FRAME.
S313 READ TOP FRAME OF FIRST CLIP AS REPRODUCTION START FRAME ACCORDING TO EDIT LIST.
S314 HAS REPRODUCTION START POSITION CHANGE COMMAND BEEN ACCEPTED ?
S315 READ DESIGNATED FRAME AS REPRODUCTION START FRAME ACCORDING TO EDIT LIST.
S316 IS PROCESS COMPLETED ?
S317 HAS REPRODUCTION START COMMAND BEEN ACCEPTED ?
S318 START REPRODUCTION FROM REPRODUCTION START FRAME ACCORDING TO EDIT LIST.
S319 UPDATE DISC INFORMATION FILE.
S320 EXECUTE COMPLETION PROCESS.
S341 HAS REPRODUCTION STOP COMMAND BEEN ACCEPTED ?
S342 HAS CURRENT CLIP BEEN REPRODUCED ?
S343 IS THERE NEXT CLIP ?
S344 CAN CLIP BE REPRODUCED ?
S345 REPRODUCE DESIGNATED CLIP ACCORDING TO EDIT LIST.
S346 STOP REPRODUCTION.
S347 READ TOP FRAME OF FIRST CLIP AS REPRODUCTION START FRAME ACCORDING TO EDIT LIST.
S348 STOP REPRODUCTION.
S349 DESIGNATE STOP FRAME AS REPRODUCTION START FRAME.
S371 DOES REPRODUCTION HISTORY CONTAIN REPRODUCTION HISTORY RECORD OF CLIP TO BE REPRODUCED ?
S372 READ FRAME DESIGNATED IN REPRODUCTION HISTORY AS REPRODUCTION START FRAME.
S373 READ TOP FRAME AS REPRODUCTION START FRAME ACCORDING TO CLIP INFORMATION FILE.
S374 HAS REPRODUCTION START POSITION CHANGE COMMAND BEEN ACCEPTED ?
S375 READ DESIGNATED FRAME AS REPRODUCTION START FRAME ACCORDING TO CLIP INFORMATION FILE.
S376 IS PROCESS COMPLETED ?
S377 HAS REPRODUCTION START COMMAND BEEN ACCEPTED ?
S378 START REPRODUCTION FROM REPRODUCTION START FRAME ACCORDING TO CLIP INFORMATION FILE.
S379 UPDATE DISC INFORMATION FILE.
S380 EXECUTE COMPLETION PROCESS.
S401 HAS REPRODUCTION STOP COMMAND BEEN ACCEPTED ?
S402 HAS CLIP BEEN REPRODUCED ?
S403 STOP REPRODUCTION.
S404 READ TOP FRAME AS REPRODUCTION START FRAME.
S405 STOP REPRODUCTION.
S406 DESIGNATE STOP FRAME AS REPRODUCTION START FRAME.
S421 TAKE-LIKE REPRODUCTION ?
S422 GENERATE HISTORY RECORD OF TAKE-LIKE REPRODUCTION.
S423 DOES CURRENT REPRODUCTION HISTORY CONTAIN HISTORY RECORD OF TAKE-LIKE REPRODUCTION ?
S424 DELETE OLD HISTORY RECORD OF TAKE-LIKE REPRODUCTION AND REGISTER GENERATED HISTORY RECORD OF TAKE-LIKE REPRODUCTION AT POSITION OF NEWEST HISTORY RECORD.
S425 DELETE OLDEST HISTORY RECORD OF REPRODUCTION HISTORY AND REGISTER GENERATED HISTORY RECORD OF TAKE-LIKE REPRODUCTION AT POSITION OF NEWEST HISTORY RECORD.
S426 EDIT LIST DESIGNATION REPRODUCTION ?

S427 GENERATE HISTORY RECORD OF EDIT LIST DESIGNATION REPRODUCTION.
S428 DOES CURRENT REPRODUCTION HISTORY CONTAIN HISTORY RECORD OF EDIT LIST DESIGNATION REPRODUCTION FOR SAME EDIT LIST.
S429 DELETE OLD HISTORY RECORD OF EDIT LIST DESIGNATION REPRODUCTION AND REGISTER GENERATED HISTORY RECORD OF EDIT LIST DESIGNATION REPRODUCTION AT POSITION OF NEWEST HISTORY RECORD.
S430 DELETE OLDEST HISTORY RECORD OF REPRODUCTION HISTORY AND REGISTER GENERATED HISTORY RECORD OF EDIT LIST REPRODUCTION AT POSITION OF NEWEST HISTORY RECORD.
S451 CLIP DESIGNATION REPRODUCTION ?
S452 GENERATE HISTORY RECORD OF CLIP DESIGNATION REPRODUCTION.
S453 DOES CURRENT REPRODUCTION HISTORY CONTAIN HISTORY RECORD OF CLIP DESIGNATION REPRODUCTION FOR SAME CLIP ?
S454 DELETE OLD HISTORY RECORD OF CLIP DESIGNATION REPRODUCTION AND REGISTER GENERATED HISTORY RECORD OF CLIP DESIGNATION REPRODUCTION AT POSITION OF NEWEST HISTORY RECORD.
S455 DELETE OLDEST HISTORY RECORD OF REPRODUCTION HISTORY AND REGISTER GENERATED HISTORY RECORD OF CLIP DESIGNATION REPRODUCTION AT POSITION OF NEWEST HISTORY RECORD.
S456 RECORD DISC INFORMATION FILE.

The invention claimed is:

1. An information process apparatus that performs a record and reproduction process for data, comprising:
    reproduction device performing a reproduction process that reads and reproduces desired material data from a record medium according to a management information file, the material data containing pictures and sound and the management information file managing a file of the material data being recorded on the record medium that is attachable and detachable to and from the information process apparatus;
    generation generating reproduction history information about each reproduction process by the reproduction device, each reproduction history information composed of (a) identification information of reproduced material data, (b) a reproduction end position, and (c) a type of reproduction method;
    record device recording a list of the reproduction history information generated by the generation device as one file different from the management information file on the record medium;
    read device reading the list of the reproduction history information recorded on the record medium by the record device;
    reproduction command accepting device accepting a reproduction command for the material data; and
    reproduction control referencing the list of the reproduction history information read by the read device, specifying material data to be reproduced and a reproduction start position according to reproduction history information according to a reproduction method designated by the reproduction command accepted by the reproduction command accepting device, controlling the reproduction device, and starting the reproduction process from the reproduction start position of the specified material data,
    wherein types of reproduction methods include at least a tape-like reproduction method that successively reproduces all clips recorded on the recording medium, a clip designation reproduction method that reproduces a designated clip and an edit list designation reproduction method that reproduces a designated unit of an edit list;
    a disc information management section determines whether the reproduction history contains a history record of the tape-like reproduction depending on whether a disc information file read section has read a history record of the tape-like reproduction from the record medium;
    when the determined result represents that the reproduction history contains a history record of the tape-like reproduction, the reproduction control device reads a frame designated in the reproduction history as a reproduction start frame from the record medium;
    when the determined result represents that the reproduction history does not contain a history record of the tape-like reproduction, the reproduction control device reads a top frame of a first clip as a reproduction start frame from the record medium according to a clip table of an index file held in an index file hold section.

2. An information process method for an information process apparatus that performs a record and reproduction process for data, the method comprising the steps of:
    causing a reproduction section to execute a reproduction process that reads and reproduces desired material data from a record medium according to a management information file, the material data containing pictures and sound and the management information file managing a file of the material data being recorded on the record medium that is attachable and detachable to and from the information process apparatus;
    generating reproduction history information about each reproduction process executed by a process of the reproduction step, each reproduction history information composed of (a) identification information of reproduced material data, (b) a reproduction end position, and (c) a type of reproduction method;
    recording a list of the reproduction history information generated by a process of the generation step as one file different from the management information file on the record medium;
    causing a read section to read the list of the reproduction history information recorded on the record medium by a process of the record step;
    causing an accepting section to accept a reproduction command for the material data; and
    referencing the list of the reproduction history information read by a process of the read step, specifying material data to be reproduced and a reproduction start position according to reproduction history information according to a reproduction method designated by the reproduction command accepted by a process of the reproduction command accepting step, controlling an execution of a process of the reproduction step, and starting the reproduction process from the reproduction start position of the specified material data,
    wherein types of reproduction methods include at least a tape-like reproduction method that successively reproduces all clips recorded on the recording medium, a clip designation reproduction method that reproduces a designated clip and an edit list designation reproduction method that reproduces a designated unit of an edit list;
    determining, by a disc information management section, whether the reproduction history contains a history record of the tape-like reproduction depending on whether a disc information file read section has read a history record of the tape-like reproduction from the record medium;

when the determined result represents that the reproduction history contains a history record of the tape-like reproduction, reading, by the reproduction control device, a frame designated in the reproduction history as a reproduction start frame from the record medium;

when the determined result represents that the reproduction history does not contain a history record of the tape-like reproduction, reading, by the reproduction control device, a top frame of a first clip as a reproduction start frame from the record medium according to a clip table of an index file held in an index file hold section.

3. A program embodied on a non-transitory computer-readable medium that causes a computer to perform a process that controls an information process apparatus that performs a record and reproduction process for data, the program comprising the steps of:

causing a reproduction section to execute a reproduction process that reads and reproduces desired material data from a record medium according to a management information file, the material data containing pictures and sound and the management information file managing a file of the material data being recorded on the record medium that is attachable and detachable to and from the information process apparatus;

generating reproduction history information about each reproduction process executed by a process of the reproduction step, each reproduction history information composed of (a) identification information of reproduced material data, (b) a reproduction end position, and (c) a type of reproduction method;

recording a list of the reproduction history information generated by a process of the generation step as one file different from the management information file on the record medium;

causing a read section to read the list of the reproduction history information recorded on the record medium by a process of the record step;

causing an accepting section to accept a reproduction command for the material data; and referencing the list of the reproduction history information read by a process of the read step, specifying material data to be reproduced and a reproduction start position according to reproduction history information according to a reproduction method designated by the reproduction command accepted by a process of the reproduction command accepting step, controlling an execution of a process of the reproduction step, and starting the reproduction process from the reproduction start position of the specified material data, wherein types of reproduction methods include at least a tape-like reproduction method that successively reproduces all clips recorded on the recording medium, a clip designation reproduction method that reproduces a designated clip and an edit list designation reproduction method that reproduces a designated unit of an edit list;

determining, by a disc information management section, whether the reproduction history contains a history record of the tape-like reproduction depending on whether a disc information file read section has read a history record of the tape-like reproduction from the record medium;

when the determined result represents that the reproduction history contains a history record of the tape-like reproduction, reading, by the reproduction control device, a frame designated in the reproduction history as a reproduction start frame from the record medium;

when the determined result represents that the reproduction history does not contain a history record of the tape-like reproduction, reading, by the reproduction control device, a top frame of a first clip as a reproduction start frame from the record medium according to a clip table of an index file held in an index file hold section.

4. A non-transitory computer-readable record medium on which material data containing pictures and sound and a management information file that manages a file of the material data are recorded, the material data and the management information file being reproduced by an information process apparatus, reproduction history information about each reproduction process of the material data by the information process apparatus being recorded as one file that is different from the management information file, each reproduction history information composed of (a) identification information of reproduced material data, (b) a reproduction end position, and (c) a type of reproduction method, wherein types of reproduction methods include at least a tape-like reproduction method that successively reproduces all clips recorded on the recording medium, a clip designation reproduction method that reproduces a designated clip and an edit list designation reproduction method that reproduces a designated unit of an edit list;

determining, by a disc information management section, whether the reproduction history contains a history record of the tape-like reproduction depending on whether a disc information file read section has read a history record of the tape-like reproduction from the record medium;

when the determined result represents that the reproduction history contains a history record of the tape-like reproduction, reading, by the reproduction control device, a frame designated in the reproduction history as a reproduction start frame from the record medium;

when the determined result represents that the reproduction history does not contain a history record of the tape-like reproduction, reading, by the reproduction control device, a top frame of a first clip as a reproduction start frame from the record medium according to a clip table of an index file held in an index file hold section.

* * * * *